(12) United States Patent
Holzrichter et al.

(10) Patent No.: US 6,738,044 B2
(45) Date of Patent: May 18, 2004

(54) WIRELESS, RELATIVE-MOTION COMPUTER INPUT DEVICE

(75) Inventors: John F. Holzrichter, Berkeley, CA (US); Erwin T. Rosenbury, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 240 days.

(21) Appl. No.: 09/870,891

(22) Filed: May 31, 2001

(65) Prior Publication Data

US 2002/0033803 A1 Mar. 21, 2002

Related U.S. Application Data

(60) Provisional application No. 60/223,487, filed on Aug. 7, 2000.

(51) Int. Cl.[7] .................................................. G09G 5/08
(52) U.S. Cl. ...................... 345/158; 345/157; 345/169
(58) Field of Search ................................. 345/173, 174, 345/179, 156, 157, 158, 163, 168, 169; 178/18.01, 18.03, 18.07, 19.01, 19.06

(56) References Cited

U.S. PATENT DOCUMENTS

| | | | | |
|---|---|---|---|---|
| 4,754,268 A | * | 6/1988 | Mori ........................... 345/163 |
| 4,988,981 A | | 1/1991 | Zimmerman et al. ....... 340/709 |
| 5,126,513 A | * | 6/1992 | Wang et al. ................. 345/173 |
| 5,345,471 A | | 9/1994 | McEwan ....................... 375/1 |
| 5,414,256 A | | 5/1995 | Gurner et al. ............... 250/221 |
| 5,442,168 A | | 8/1995 | Gurner et al. ............... 250/221 |
| 5,457,394 A | | 10/1995 | McEwan ..................... 324/642 |
| 5,510,800 A | | 4/1996 | McEwan ..................... 342/387 |
| 5,512,834 A | | 4/1996 | McEwan |
| 5,589,838 A | | 12/1996 | McEwan ..................... 342/387 |
| 5,661,490 A | | 8/1997 | McEwan ..................... 342/387 |
| 5,682,164 A | | 10/1997 | McEwan ...................... 342/27 |
| 5,693,914 A | * | 12/1997 | Ogawa ..................... 178/18.07 |
| 5,729,220 A | * | 3/1998 | Russell ........................ 341/22 |
| 5,739,812 A | * | 4/1998 | Mochizuki et al. ......... 345/163 |
| 5,751,229 A | * | 5/1998 | Funahashi ...................... 341/5 |
| 5,898,136 A | * | 4/1999 | Katsurahira ............. 178/18.01 |
| 5,920,288 A | | 7/1999 | Sorrells ...................... 342/465 |
| 5,977,958 A | | 11/1999 | Baron et al. ................ 345/179 |
| 5,982,352 A | | 11/1999 | Pryor .......................... 345/156 |
| 6,067,080 A | | 5/2000 | Holtzman ................... 345/173 |

FOREIGN PATENT DOCUMENTS

WO    WO 99/25152    5/1999    ............ H04R/5/00

* cited by examiner

*Primary Examiner*—Regina Liang
(74) *Attorney, Agent, or Firm*—Eddie E. Scott; Alan H. Thompson

(57) ABSTRACT

The present invention provides a system for controlling a computer display in a workspace using an input unit/output unit. A train of EM waves are sent out to flood the workspace. EM waves are reflected from the input unit/output unit. A relative distance moved information signal is created using the EM waves that are reflected from the input unit/output unit. Algorithms are used to convert the relative distance moved information signal to a display signal. The computer display is controlled in response to the display signal.

64 Claims, 21 Drawing Sheets

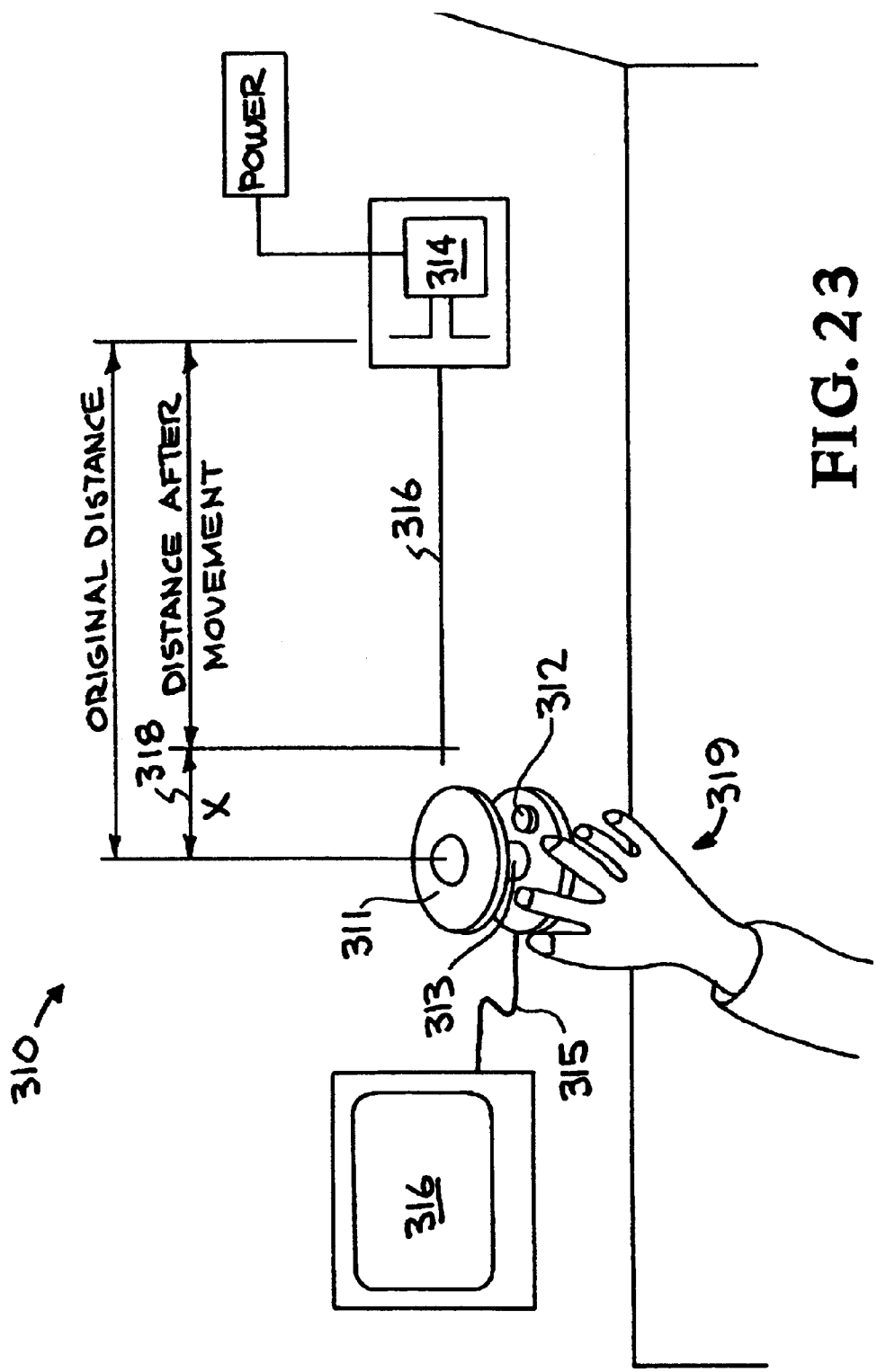

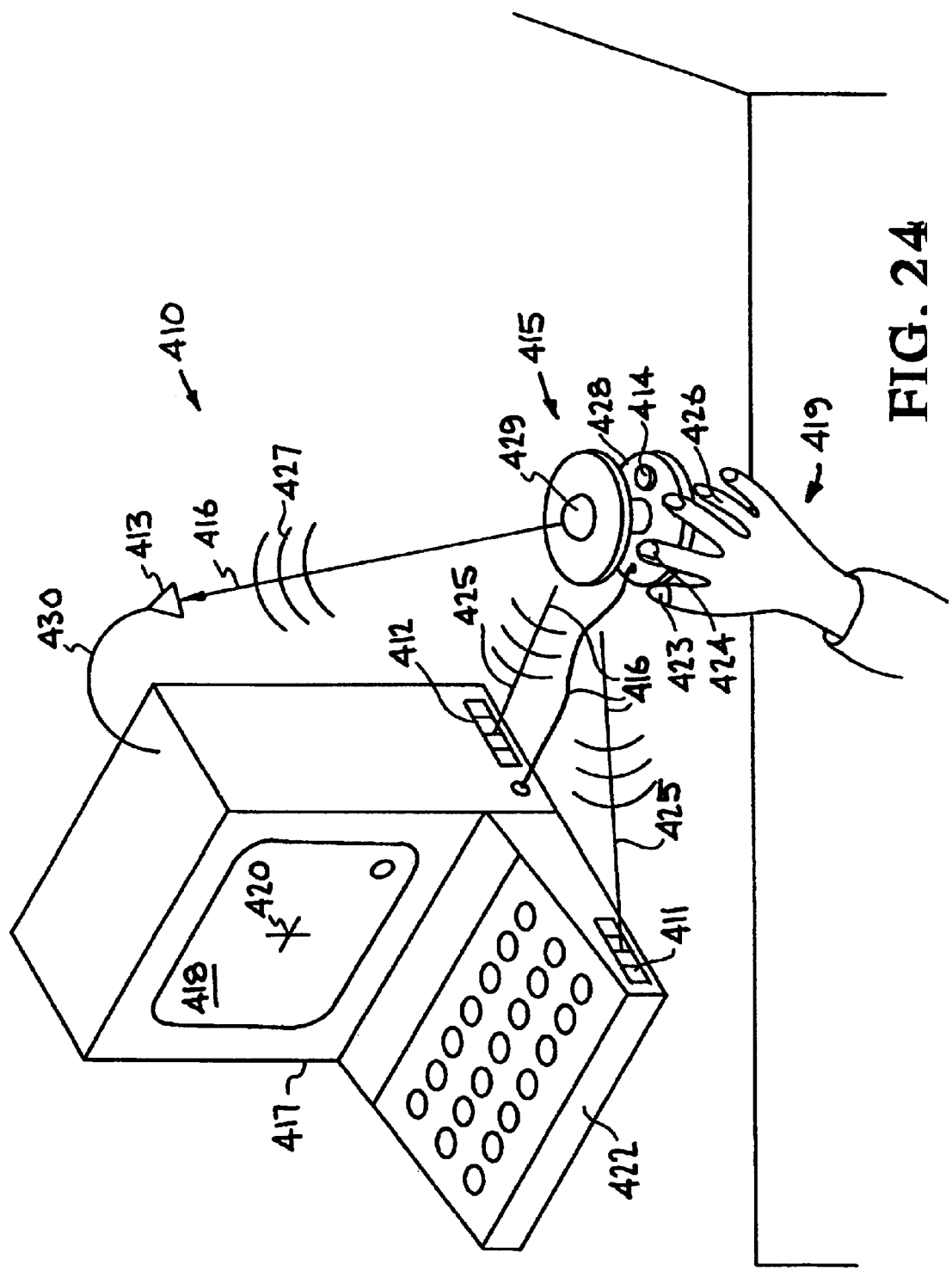

WIRELESS, RELATIVE-MOTION COMPUTER INPUT DEVICE

CROSS-REFERENCE TO RELATED APPLICATIONS

This application claims the benefit of U.S. Provisional Application No. 60/223,487 filed Aug. 7, 2000, entitled "SYSTEM AND METHOD FOR WIRELESS, RELATIVE-MOTION COMPUTER INPUT DEVICES," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to computer input devices and more particularly to a wireless computer input system.

2. State of Technology

The abstract of U.S. Pat. No. 4,988,981 for a computer data entry and manipulation apparatus and method by Thomas G. Zimmerman and Jaron Z. Lanier, patented Jan. 29, 1991, provides the following description: "Apparatus is disclosed for generating control signals for the manipulation of virtual objects in a computer system according to the gestures and positions of an operator's hand or other body part. The apparatus includes a glove worn on the hand which includes sensors for detecting the gestures of the hand, as well as hand position sensing means coupled to the glove and to the computer system for detecting the position of the hand with respect to the system. The computer system includes circuitry connected to receive the gesture signals and the hand position signals for generating control signals in response thereto. Typically, the control signals are used to manipulate a graphical representation of the operator's hand which is displayed on a monitor coupled to the computer system, and the graphical representations of the operator's hand manipulates virtual objects or tools also displayed by the computer."

The abstract of U.S. Pat. No. 5,414,256 for an apparatus for and method of controlling a device by sensing radiation having an emission space and a sensing space by Asaf Gurner and Oded Y. Zur, patented May 9, 1995 provides the following description, "An optical controller is capable of surrounding a player with a radiation screen from a plurality of panels, and enables the player to produce control signals for interface with a controlled instrument such as a musical instrument, a video game processor, etc. The insertion of the appendage of the player can produce a functional control signal. The relative position of the insertion of the appendage can be determined, for example, as a result of the intensity of the reflected radiation in the dispersing radiation screen and adjusted in elevation. The video game processing unit can play either a conventional video game that usually accepts eight functional control signals, or it can utilize the full capacities of the control signals available from the optical controller for enhanced play action."

The abstract of U.S. Pat. No. 5,442,168 for a dynamically-activated optical instrument for producing control signals having a self-calibration means by Asaf Gurner and Oded Y. Zur, patented Aug. 15, 1995 provides the following description, "An optical controller is capable of surrounding a player with a radiation screen from a plurality of panels, and enables the player to produce control signals for interface with a controlled instrument such as a musical instrument, a video game processor, etc. The insertion of the appendage of the player can produce a functional control signal. The relative position of the insertion of the appendage can be determined, for example, as a result of the intensity of reflected radiation in the dispersing radiation screen. The video game processing unit can play either a conventional video game that usually accepts eight functional control signals, or it can utilize the full capacities of the control signals available from the optical controller. The player can simulate the movements of the video character to experience a more realistic game play action."

U.S. Pat. No. 5,510,800 for a time-of-flight radio location system by Thomas E. McEwan, patented Apr. 23, 1996 and U.S. Pat. No. 5,661,490 for a time-of-flight radio location system by Thomas E. McEwan, patented Aug. 26, 1997 provide the following descriptions, "A bi-static radar configuration measures the direct time-of-flight of a transmitted RF pulse and is capable of measuring this time-of-flight with a jitter on the order of about one pico-second, or about 0.01 inch of free space distance for an electromagnetic pulse over a range of about one to ten feet. A transmitter transmits a sequence of electromagnetic pulses in response to a transmit timing signal, and a receiver samples the sequence of electromagnetic pulses with controlled timing in response to a receive timing signal, and generates a sample signal in response to the samples. A timing circuit supplies the transmit timing signal to the transmitter and supplies the receive timing signal to the receiver. The receive timing signal causes the receiver to sample the sequence of electromagnetic pulses such that the time between transmission of pulses in the sequence and sampling by the receiver sweeps over a range of delays. The receive timing signal sweeps over the range of delays in a sweep cycle such that pulses in the sequence are sampled at the pulse repetition rate, and with different delays in the range of delays to produce a sample signal representing magnitude of a received pulse in equivalent time. Automatic gain control circuitry in the receiver controls the magnitude of the equivalent time sample signal. A signal processor analyzes the sample signal to indicate the time-of-flight of the electromagnetic pulses in the sequence.

FIG. 13 of McEwan Pat. No. 5,510,800 illustrates a simple head position sensing system implemented according to the present invention. In this system, a transmitter 500 is mounted on a user's headset 501, worn by a user of a computer system 502. The receiver box 503 is mounted on the computer system 502 and connected across cable 504 to a standard mouse interface. The receiver box 503 includes a first receiver 505, a second receiver 506 and a third receiver 507 each generating a time-of-flight measurement for pulses generated by the transmitter 501. The receiver box 503 produces data indicating the time-of-flight from the transmitter 500 to each of the three receivers 505, 506, 507 can be used for precise position detection of the transmitter 500 mounted on the headset 501. The user is tethered by a small diameter coaxial cable 508 to the receiver box 503 to provide timing in the embodiments described. Computer system 502 includes the standard monitor 510 and keyboard 511 and may be used for executing interactive computer programming based on the position data produced according to the present invention. Various arrangements of the transmitters and receivers may be used to triangulate, providing six axis information: x, y, z in translation and 3 axes of rotation for the transmitter 500."

The abstract of U.S. Pat. No. 5,982,352 for a method for providing human input to a computer by Timothy R. Pryor, patented Nov. 9, 1999, provides the following description, "The invention provides a method for providing human input to a computer which allows a user to interact with a display connected to the computer. The method includes the steps of placing a first target on a first portion of the user's body, using an electro-optical sensing means, sensing data related to the location of the first target and data related to the location of a second portion of the user's body, the first and second portions of the user's body being movable relative to each other, providing an output of the electro-optical sensing means to the input of the computer, determining the location of the first target and the location of the second portion of the user's body, and varying the output of the computer to the display based upon the determined locations for contemporaneous viewing by the user."

The abstract of International Patent No. WO 99/25152A3 for "INTERACTIVE DEVICES AND METHODS," published May 20, 1999 provides the following description, "A body-wearable interactive device with a retractable earbud and a microphone provides data, audio and voice communication with a wearable personal computing or other remote device. Full voice and display interface with a personal computer can be achieved with the use of a wireless link between the input/output device and computer. The device is adapted for use with a variety of ancillary communications devices to provide flexibility in field and mobile communications scenarios. Corresponding methods are also disclosed by which a wearer can effect communication through and with the interactive device."

Discussion of Background Art—There is a wide variety of literature on devices that enable a human user to input information into a computer system by moving or manipulating a hand-held object or moving or manipulating an object attached to a user's body. For purposes of explaining the present invention, such devices are part of a class of objects called "computer input devices," which will be also called "input devices" or "locator-units" in this application. The most common computer input device (excepting the typing keyboard) is the ubiquitous computer "mouse."

Many other methods and systems have been described that enable input devices to provide information to a digital computer for purposes of moving a cursor on a monitor screen, for "clicking" on a menu object, and for many other applications. Many combinations of mechanical, optical, electronic, and acoustic devices have been investigated for rendering hand motion into an electronic signal that represents the hand motion. These systems then convey such motion information to a digital computer input system, where the electronic signal is processed into computer control information. This control information is usually displayed on a computer monitor screen for purposes of graphical communication to the user, and for user direction to the computer and attached systems. Examples include the presentation of a screen "cursor" that moves proportionally to the hand motion. If the cursor is moved to a screen menu, its presence can cause a "menu" of options to be displayed, and when a hand activated button is pressed, said menu item is "selected" meaning that the computer is directed (i.e., controlled) to do something associated with the menu symbol.

For purposes of explaining the present invention, motion detection or motion measurement is defined here to mean automated distance measuring over a time interval usually associated with hand movement of an object; or it can mean the distance traveled of a locator unit from the "on-click" of a device button and lasting until the "off-click" or release of a device button. This definition of motion is one of "relative motion" from a start-of-measurement signal to an end signal, or from "start" to a next start-of-measurement signal.

An example of relative-motion measurement is illustrated by the hand-moved "mouse." This device relates rolling motion of an element, which is caused to roll by friction contact against a surface, to linear motion of a cursor on a computer screen. In other words, the distance moved by the periphery of the ball's surface, is measured using a combination of electrical, mechanical, or optical elements; and this distance is scaled, using software, to cause a cursor on a computer monitor screen to move a desired distance on a screen. Such devices usually work by providing two degrees of motion information in two orthogonal dimensions (e.g., x and y) by rolling on a surface. One commonly used variation of this device is to use a stationary supported rolling element that points upwards, and which is "rolled" by the palm of a user's hand as it rolls over the surface of the ball. The direction and distance of hand motion is converted to x and y coordinate changes, which are converted to up/down and sideways motion on a monitor screen.

Many system variations have been described that are intended to enable the hand-directed motion of the "mouse" to be more easily rendered for purposes of being more cheaply constructed, safer to use, more accurate, and many other reasons. These variations have employed low-power electromagnetic ranging radars, ranging acoustic systems, optical imaging systems to convert image motion to distance, gloves with light emitters coupled with optical triangulation systems for distance measurement, intelligent pads upon which the mouse moves and the pad senses the mouse's location, and many others. These other types of systems have not been widely accepted by users because of cost, reliability, interference with other objects, needed workspace requirements, FCC and FDA licensing issues, safety issues, encumbering issues to the user's hands, and other problems.

Devices employing light emitting elements, such as optical fiber or LEDs (light emitting diodes), use optical sensors to determine the distance traveled of one or more light emitters. An optical sensor, such as CCD camera, can view the light spots from several directions. Then the relative motion of an emitting source can be measured and scaled, using triangulation techniques, using computer software, to direct a cursor or some other element on a computer screen, to move in proportion to the light emitter motions.

Computer input devices using low-power radar or ultrasonic systems (with transmitters located either in the hand-held input device or at the edges of the workspace), usually measure either absolute distances (i.e., range) from a start location to an end location, or they measure frequency shifts associated with velocity which must be integrated to obtain distance traveled. The distance traveled is defined by subtracting the initial-location coordinates from the final-location coordinates. These radar and acoustic devices suffer from lack of resolution, especially at the required millimeter distance or at the sub-millimeter/second velocity resolution levels of a hand-directed unit. They are expensive, use too much power to be wireless, often have safety issues, are incompatible with FCC radio-emission issues, suffer from multi-path and from "clutter" effects, and commonly require wired attachment to the hand- or body-directed system component.

Other existing hand-held computer input devices such as the "mouse" with rolling elements, or gloves with optical emitters, all suffer from one or more other problems. These include requiring wired connections, requiring clear linesof-sight from the device to a camera, or it must rest on a table surface, or it lacks needed accuracy, or they are only useable by one person at a time. In addition, rolling devices are sensitive to being disabled by dirt; and gloves with attached wires impede the motions of the user. An important issue is that the "mouse" and the "click" buttons cause repetitive motion injury to many users. These injuries appear to occur because the mouse-motion on a plane and the location of the attached buttons is incompatible with natural hand-wrist-finger motions.

In response to the concerns discussed in the prior art, what is needed is a system and method for a low-cost relative distance determining input device that overcomes the problems of the prior art. The present invention provides systems and methods to improve relative-distance input devices employing low-cost, wireless input devices for computers and other automated systems.

SUMMARY OF THE INVENTION

The present invention provides an electromagnetic (i.e., EM) system for controlling a computer display in a workspace using an input unit/output unit. A train of low power EM waves are sent out to flood the workspace. EM waves are reflected from the input unit/output unit and measured. A relative distance moved information signal is created using the EM waves that are reflected from the input unit/output unit and measured. Algorithms are used to convert the relative distance moved information signal to a display signal. The computer display is controlled in response to the display signal. In an embodiment of the invention, an electromagnetic system includes at least one sensor producing EM waves and one receiving EM waves. A reflecting antenna is operatively connected to the input system for interacting with the electromagnetic waves and producing relative distance traveled information. Algorithms convert the relative distance traveled information to display signals. A system controls the computer display according to said display signals.

Other features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description and by practice of the invention.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIG. 23 shows a one dimensional reversed sensor-locator system

FIG. 24 shows a 3-dimensional reversed sensor-locator system.

DETAILED DESCRIPTION OF THE INVENTION

Figure 1:
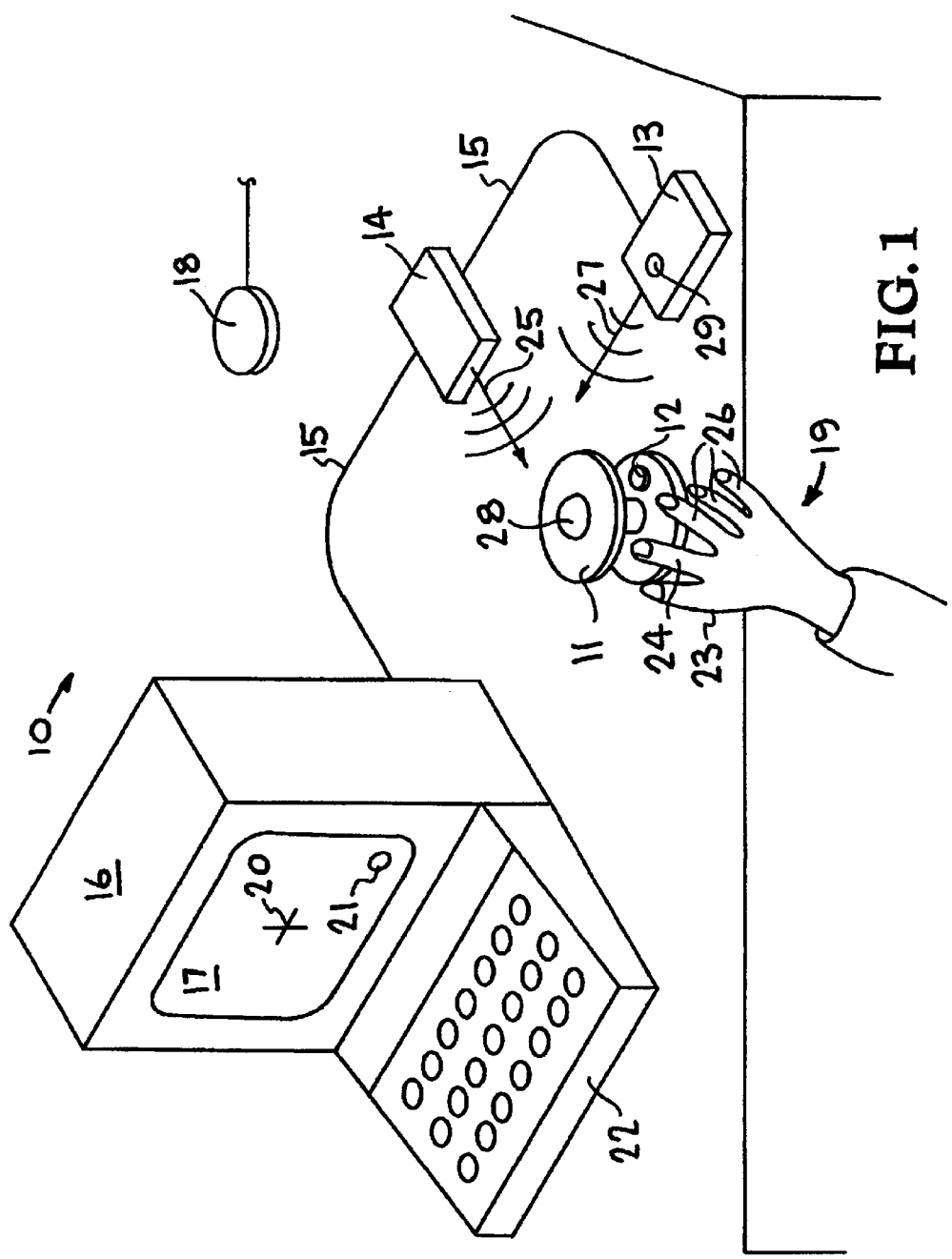
FIG. 1 shows the system and components of an embodiment of the present invention.

Referring to the drawings, various embodiments of the present invention are shown. The embodiments provide systems and methods for characterizing the relative movement of a human body part as a graphical image on a monitor screen. They also provide systems and methods for characterizing relative movement applications to other animate and inanimate system part motions. The drawings and the detailed descriptions describe specific embodiments of the invention. The detailed descriptions of the specific embodiments, together with the general description of the invention, serve to explain the principles of the invention.

FIG. 1 is a pictorial diagram of a desktop illustrating a hand-directed information input system for a computer that incorporates an embodiment of the present invention. The hand-directed information input system is generally designated by the reference numeral 10. The system 10 includes the following structural units and operating elements: locator unit including antenna 11, button 12, EM Sensor 13, EM Sensor 14, signal wires or wireless paths 15, computer 16, screen 17, charger unit & rest locator 18, hand 19, cursor pattern 20, cursor home pattern 21, keyboard 22, thumb 23, first finger 24, EM waves 25, fingers 26, EM waves 27, light emitter 28, and light sensor 29. Hand-directed locator unit (including antenna) 11 with button 12 controls an EM Sensor System that includes "EM Sensor #1" designated by the reference numeral 13 and "EM Sensor #2" designated by the reference numeral 14. Signal wires or wireless paths 15 transmit signals to computer 16. Algorithms in the computer convert signals from the EM sensor system into cursor 20 movements on a screen 17.

The two EM sensor units 13 and 14 send out a train of EM waves that "flood" a workspace and that can pass through non-metallic objects such as plastic covers or human body tissue. The two EM sensor units 13 and 14 are not necessarily located at right angles to each other. A wireless (or wired) locator unit 11 includes an EM-wave antenna that reflects the EM waves sent by the EM sensors. The antenna reflectivity is switched on and off at rates, typically ranging from 200 Hz to >3 kHz, when a button on the unit is pressed to activate the automated antenna-switching process. The switching signal is coded to enable information to be carried back to the EM sensors via the reflected EM waves, at a very low cost. Each EM sensor unit ("EM Sensor #1" designated by the reference numeral 13 and "EM Sensor #2" designated by the reference numeral 14, in FIG. 1) measures the relative distance that the locator unit 11 is moved (as directed by a user's hand 19 or other body part) along the direction of the EM-wave beam that is transmitted from each EM sensor 13 and 14. By relative we mean distance from start to finish of motion. A battery-charger unit 18 can be included to keep the locator-unit battery fully charged, even though the unit draws very little power when turned on.

The basic structural elements having been described, the concept of operation of the system 10 will be described. The locator unit 11 moves in a space illuminated by one or more EM waves, and the properties of a reflected EM wave is received by an antenna on the EM sensor unit and is compared to a reference wave inside each sensor 13 and 14. A comparison approach is called "homodyne" detection, and is a form of EM-wave interferometry. This process compares the phase of a reflected EM wave (from a modulated reflector antenna) to that of a local fixed (called a reference) wave inside the EM sensor unit; and the change of this signal (i.e., its level, sign, or slope) is associated with a phase change in the reflected wave. Then this phase change is associated with a change in position of the antenna and the attached locator unit 11. This type of phase comparison produces signals that can be used to keep track of how many total, as well as partial, wavelengths the locator unit moves in the field of the radar beam. The methods herein usually make use of two internally generated signals, one normal, and one 90° out of phase which is called quadrature. The methods make use of pre-measured spatial patterns of the EM waves to define relative distance changes of a locator unit. This approach diminishes the reliance on measured signal amplitude levels which has led to unacceptable motion errors in prior-art systems. In addition, the method takes advantage of the fact the "eye-hand" coordination process is insensitive to the exactness of the linear relationship between hand motion and cursor motion on a screen. Thus very simple pattern matching algorithms can be used to move the cursor in response to hand (or other body part) motion. If more accuracy is required, the methods described below enable desired accuracy to be achieved.

This approach utilizes some procedures that are related to those procedures called quasi-continuous, coherent radar, moving-target indication techniques. (See M. Skolnik "Radar Handbook, $2^{nd}$ Ed., McGraw-Hill, and references therein, for discussions of prior-art coherent radar systems.) Many of the previously described individual component features (used as system elements herein) have been demonstrated in prior art. However it is to be understood that the systems and methods described herein provide a unique manner in which these components are modified and assembled into a system, and directed by algorithmic procedures to determine accurate relative distances. These unique methods enable a user to cause the movement of a symbol on a computer screen, as a locator-unit is moved, in a cheaper, more robust, easier to use and fashion than prior art systems.

Using timing, filtering, and statistical techniques, each example EM sensor can be arranged so that it only measures EM-wave reflections corresponding to its own EM-wave transmissions reflected from a "matched" example locator unit. If an example locator unit has an antenna that is approximately resonant with the EM waves sent by the example EM sensor, and if it has one or more preset internal antenna-switching frequencies that correspond to filter passbands internal to the corresponding example EM sensor (see FIG. 4), the EM sensor will measure the locator-unit's relative motion. Stationary or moving objects that reflect EM waves back toward the originating EM sensor are not detected by the EM sensors used in the mode described, because they do not reflect EM waves with a characteristic modulation. Also, other locator units if reflecting EM waves from their switched antennas with other modulation frequencies, do not cause a signal to be produced in the sensor associated with the movement of the example locator unit. In other words, several locator units can be used in the field of view of one EM sensor, if their respective antenna-switching rates are sufficiently different (e.g., typically >±400 Hz) that their signals can be separated by internal filters and directed to specific filter outputs within the EM sensor. (See FIG. 4.) Finally, EM waves sent from the example EM sensor can reflect off of nearby objects (e.g., the PC computer housing) and reach a locator unit, which can modulate and further reflect the EM wave back to the example EM sensor unit. This is called a "multi-path" wave, and its effect can be greatly reduced by using a directional locator-unit antenna, and by using the known spatial pattern of "directly" reflected waves (in contrast to reflected waves) to remove the spatial patterns generated by oblique "multi-path" waves.

In addition, the procedures herein allow the use of a second antenna modulator within a given individual locator-unit (see FIG. 7), operating at a different modulation frequency and using a different waveform, for purposes of signaling an event to the EM sensor. This event can be easily measured at one of the possible several outputs of a second filter in the sensor (65 in FIG. 4). An example is that a second button unit on a locator unit, when pressed, energizes a second antenna switching unit, see FIG. 7, that is detected and sent to the PC processor (see FIG. 1) and used to select a menu item under the cursor icon, or other applications. In addition, FIG. 1 shows an optional optical signaling system using an infrared light emitting diode for example, that can be detected by a simple receiver on a wireless unit. It can also be used to send signals, conveniently augmenting the primary EM-wave systems and methods described herein. Wireless communication can also be attached to the locator unit and used.

The distance that the locator unit 11 is moved, is determined by the pattern of signal value measurements, each value being measured and digitized by an EM sensor. The sequence of values as the locator-unit is moved is sent to a computer and stored in a memory, where one or more algorithms process the sequence of data values. The algorithms determine how far the unit may have been moved while the "button" was held in the "on" position. They can also estimate initial positions and other information. These algorithms may be rendered in digital or analog formats, depending upon the application and cost objectives.

A particular aspect of the system and the methods, described herein, are that they depend upon signal amplitude-pattern information versus distance (i.e., "patterns") to determine distances moved. Patterns of amplitude levels and ratios of amplitude levels are used to remove unusual amplitude changes when these systems are used in cluttered working environments, where amplitude can change for several reasons other than movements of the locator-unit in the EM wave field of the EM sensor. For example, such EM signal level changes can be caused by interruptions of the EM path, from sensor to locator-unit, by a body part. Examples are finger motion as it reaches to press a button or moving the hand relative to the locator-unit.

Another source of unusual amplitude variations are caused by the motions of multiple users of hand held wand locator-units who are moving in front of a projection screen (see FIG. 21) and in front of each other. Other causes of amplitude changes can be increased distance of the locator unit from the EM sensor, where the wave amplitude falls off as $1/(distance)^2$ to the locator unit, and back $1/(distance)^2$ to the EM sensor. This leads to a fall off in EM signal level proportional to $1/(distance)^4$ for the EM wave round trip from sensor to locator-unit and back to the EM sensor. Other concerns such as low battery charge, and "multipath" interference can change the expected signal levels. Algorithms that correct for these problems are part of the inventive features herein and are described below. Algorithms that correct for signal change rely mostly on using data from the two signal outputs, $S_{normal}$ and $S_{quadrature}$ of each EM sensor, and on using prior knowledge (e.g., calibration and initial set up) to obtain expected signal level patterns. This prior knowledge includes the peak-to-null sensitivity patterns in the workspace, expected patterns and rates of user motion, and constraints imposed by the smooth patterns of the homodyne sensitivity function. In addition, "multi-path" effects can be removed by using data obtained as the user moves the locator-unit the first time, as he/she turns on the machine. They can also be reduced to unimportant levels using directional antennas in the locator units.

The sequences of signal values, measured by the EM sensors, as a locator unit moves, are processed by algorithms located within the sensor or in the corresponding computer processor (or they can be distributed in both the sensor and processor). These algorithms can be digital or analog, depending upon the cost and performance needed. In one embodiment of the invention, it is expected that analog circuits will process the signal associated with the reflected EM wave from the locator-unit antenna using the filter units in FIG. 4, and that digital circuits will be used for the peak detector and peak-signal smoothing unit, also for the bus formatting and driver units in FIG. 4, and for the processor in the PC in FIG. 1, FIG. 22, FIG. 23, and FIG. 24.

The algorithms determine the distance traveled by the locator unit, by comparing the EM sensor signal values versus position in the workspace to a pre-stored (and usually corrected) curve of signal pattern versus position. Such pre-stored curves (i.e., data patterns) are loaded into the computer memory unit when the Wireless, Relative Motion Computer Input Device, which is the object of this application, is manufactured and also when it is first connected by a user to a computer such as a PC or Macintosh, or other digital or analog processing systems.

Additionally, as part of the algorithm methods herein, a "training" or calibration cycle may be requested by the computer to the user. The request from the computer asks that the user move the locator unit from one part of the workspace to another. This action defines the operating space, and automatically scales the cursor's (or other icon object's) movement to move a desired amount on the computer screen as the locator unit is moved. The start algorithm also scales the amplitude levels of the homodyne peaks across the workspace as they change due to distance or as they change due to low-level "multi-path" interference. During operation of the locator unit, when the button is pressed on the unit, a pattern of signal values is measured by the EM sensor and processed by the algorithm (or algorithms). These are in turn related to distance traveled, and are used to move (for example) a cursor on the monitor screen a corresponding distance.

As an example of pattern recognition, obtained by using low-power homodyne radar systems, with both a normal, $S_N$, and a quadrature output, $S_Q$, one can measure reflected signals from the locator unit that exhibit distinct signal pattern-markers every ⅛ of the sensor's wavelength, as locator unit is moved across the work area. The markers are the zero crossings (see FIGS. 2 and 3) and the peak values of the two outputs, $S_N$ and $S_Q$, of a normal and quadrature-output homodyne radar-like electronic sensor. For example, by using an EM sensor that transmits EM waves at a frequency near 2.3 GHz, with $\lambda$=12 cm wavelength, there is a marker at every 12 cm/8=1.5 cm. By using these markers, and by then using simple algorithms that interpolate between such markers, the system can provide information on distance changes versus time to a computer for subsequent system control, with resolution of less than one millimeter.

Figure 2:
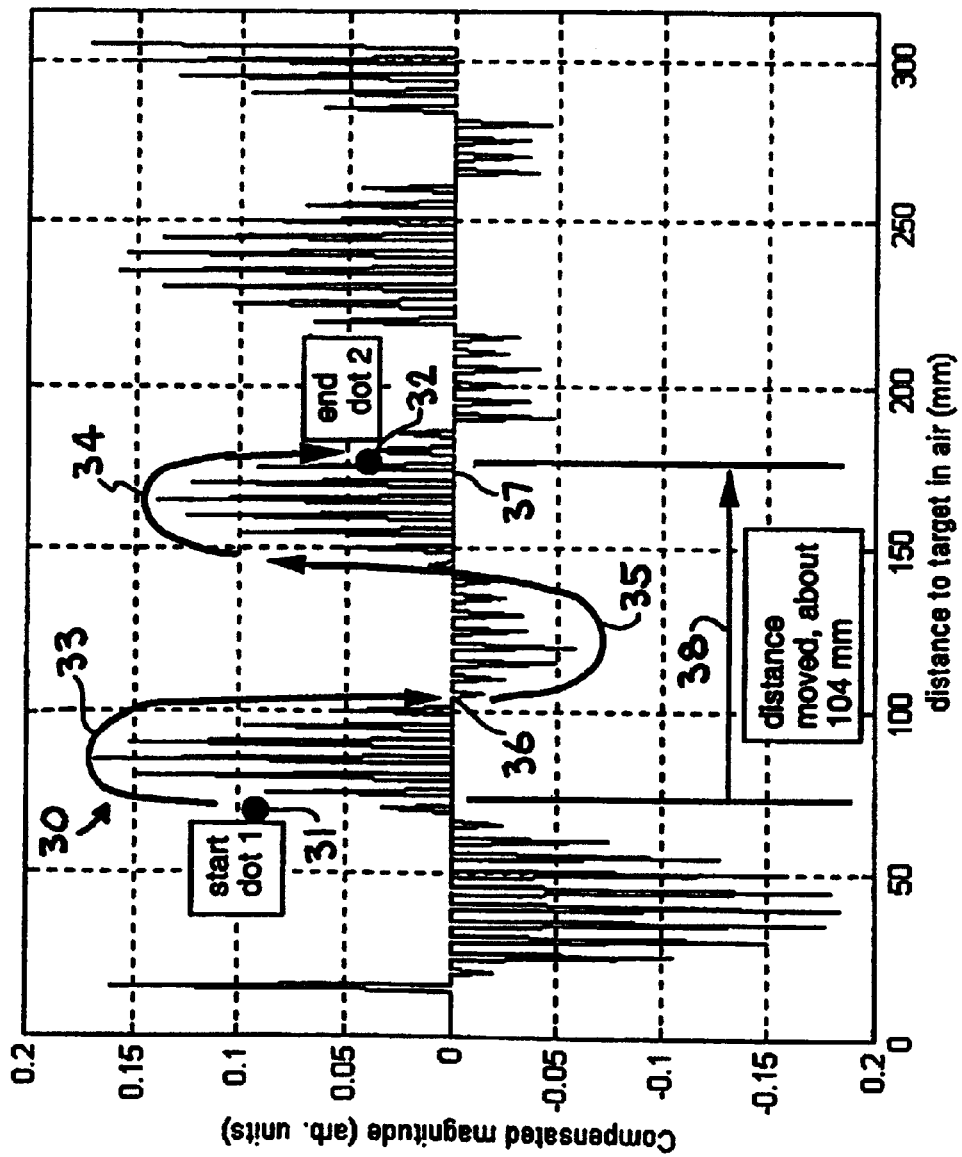
FIG. 2 shows a homodyne EM sensor, normal output versus distance curve.
Figure 3:
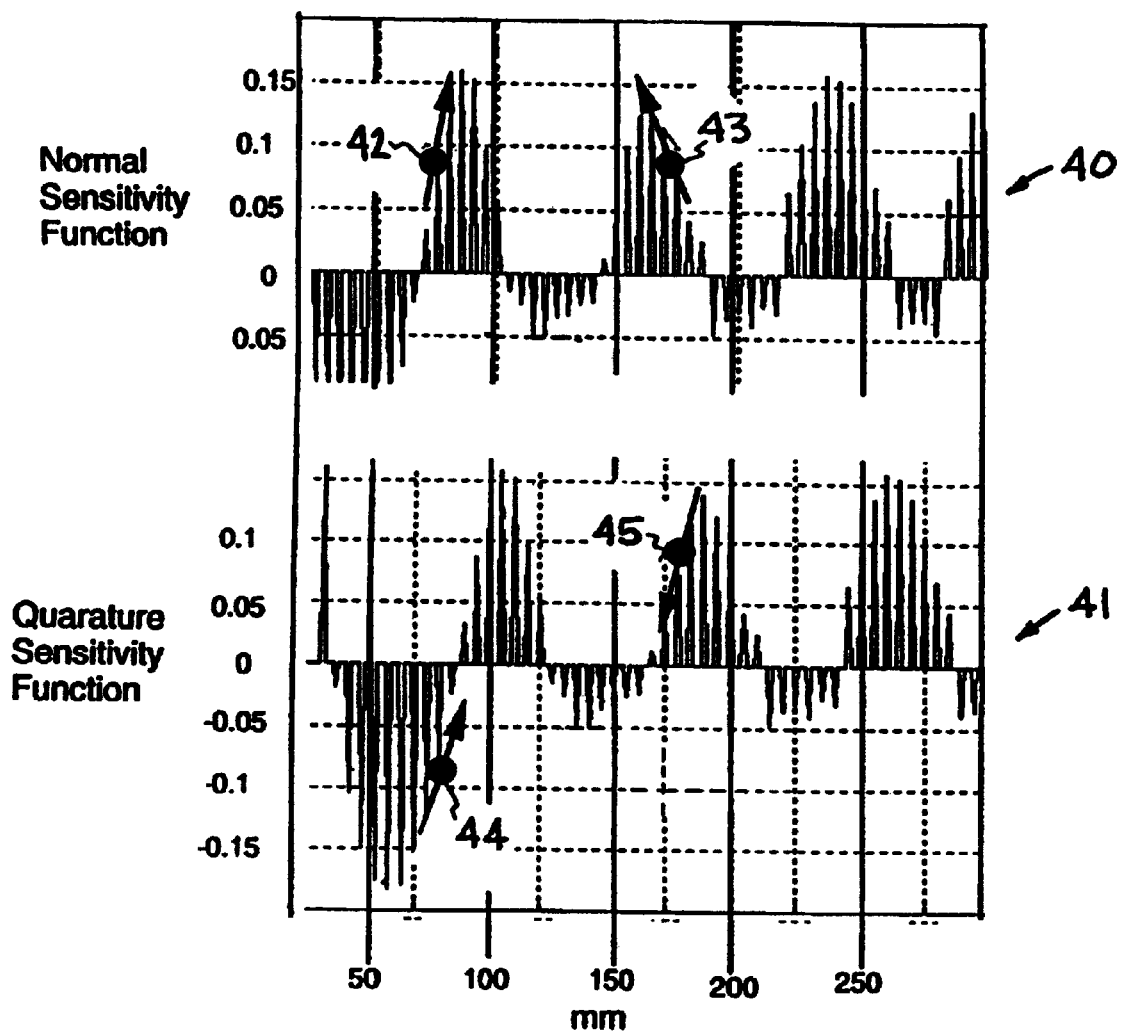
FIG. 3 shows a homodyne EM sensor with both normal and quadrature output curves.
Figure 4:
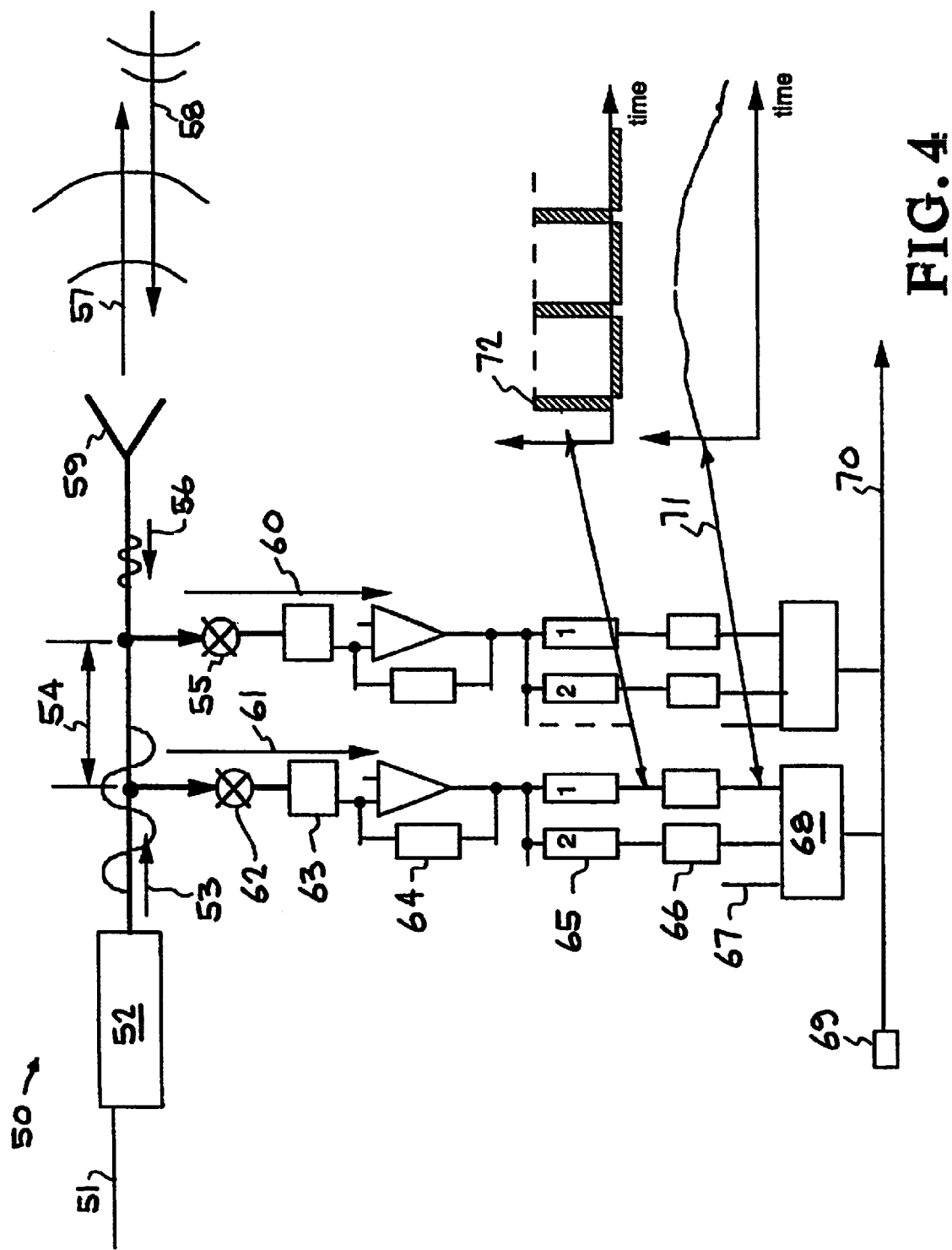
FIG. 4 is a block diagram of an EM sensor and output system.

FIG. 2 shows an example of a curve generated by using a 2.3-GHz homodyne radar system that transmits a multi-cycle EM pulse train from a transmitting antenna. This EM pulse train was reflected (in the experiment yielding FIG. 2) from a modulated reflector located at distances ranging from a few centimeters to about 30 cm distant from the antenna. The reflected EM wave was detected in the sensor using a second antenna (e.g., similar to the block diagram in FIG. 4 showing the normal signal processing path $S_N$, but in FIG. 4 only one antenna is used for both transmitting and receiving). A receiver used homodyne mixer technology (e.g., a non-linear solid state diode), an integrator, amplifiers, a base-line reset circuit, a high pass filter, and a maximum-peak detector, to provide a sequence of single output signals, as shown in FIG. 2, for each of a sequence of measurement locations. An example of such a sensor is described in the U.S. Pat. No. 5,512,834 Homodyne Impulse Radar Hidden Object Locator, inventor Thomas E. McEwan. In order to provide direction information and to double the accuracy, the preferred system in FIG. 1 uses a homodyne radar with two outputs, normal and quadrature. (See FIG. 3 and FIG. 4) Each output is similar to that shown in FIG. 2, but the second output (the quadrature output) is delayed by ¼ wave (by a phase of 90°) relative to the normal first signal. Two outputs are illustrated in FIG. 3. The digital algorithms analyze both outputs, and use the relative sign and slope of each output, at each sampling time, to determine the direction in which the locator unit is being moved. In addition, it uses the zero crossings, signal values, slope of signal change, zone location, and peak values from both normal and quadrature signals to obtain 8 markers per wave length traveled by the locator unit. It also uses the ratio of the two signals $S_N$ and $S_Q$ to remove amplitude noise.

This illustrative system, shown in FIG. 1, describes a tabletop arrangement for inputting distance information into a desktop computer. Many other variants of this system are possible, and are included in this application. They include a three-dimensional locator unit, which looks like a hand-held wand. It uses three EM sensors for locator motions in three dimensions (e.g., side-to-side, up/down, and in/out). The third EM sensor can be used to direct graphics on a computer wall projection system, and allow the user to "enter" the image and direct where he is going. Another example is to attach two or more locator units to a moving robot arm, to obtain both linear and rotational motions of the arm. Another example is to attach a locator unit to a head-mounted boom microphone in front of a user's mouth. This location in front of the mouth enables a user to turn his or her head and cause a cursor to move right/left or up/down. Speech can be used to input commands similar to "button" pressing on present "mouse" devices. These can be inputted using acoustic speech recognizers or EM sensed speech commands (see U.S. Pat. No. 6,006,175 Methods of Non-Acoustic Speech Characterization and Recognition, and U.S. Pat. No. 5,729,694 Speech Coding, Reconstruction and Recognition Using Acoustics and Electromagnetic Waves, which are hereby incorporated by reference in their entirety); or single-stroke key-board entry can be used as the "button" to energize a cursor-designated menu item.

The present invention makes possible increased freedom of user motion (i.e., no wires to the hand-held locator device). The EM sensors in the preferred system are safe to use in the presence of humans because the radiated power levels are well below US and international standards for continuous exposure. They radiate <1/1000 the power of a cell phone, and their emissions are narrow bandwidth and can be designed to be well within FCC regulations. The system locator units are consistent with ergonomic principles; and they are reliable, having no moving mechanical elements other than one or more buttons. The received EM sensor signals can be "freed" from clutter and multi-path interference problems; and each set of EM sensors can be used by several users at once, each using a locator-unit operating at a different switching frequency. Finally, the system is very low in cost to manufacture.

FIG. 2 shows a exemplary sensitivity curve 30, of a single output EM sensor which transmits an EM-wave pulse train, consisting of 10 sine waves with a 2.3-GHz central frequency. The sensor transmits this wave train 2 million times per second, to a target whose reflector was being modulated at about 200 Hz. The curve 30 shown in FIG. 2 was obtained from an experiment in which the target was located at a sequence of increasing distances from the radar unit, at positions shown on the x-axis, each of which is about 5-millimeters larger than the last position. The signed amplitude v. distance was compensated for an attenuation with distance. In one typical example of use of the preferred invention, the user would press a button on the hand-held "location unit" which begins the modulation of the reflecting antenna circuit within the unit. The user might move the unit from a location 76 mm from the homodyne radar antenna (see dot 1, reference numeral 31, where he/she first pressed the "on button"), to a new position a 180 mm (see dot 2, reference numeral 32, where he/she released the on button). The radar signal would first see a signal value of $S_N$=0.095, then it would traverse the sensitivity curve raising in value until it reached a maximum value of $S_N$=0.17 at x=85 mm, then it would drop in value until it crosses the zero value at x=105 mm, then it would become a negative value reaching a peak negative value $S_N$=0.055 at x=120 mm, and then become less negative, crossing the zero line again at x=145 mm, until it reaches another positive peak of $S_N$=0.14 at x=165 mm, and then dropping until the user releases the button, at x=180 mm, with a final signal value of $S_N$=0.04. This pattern of radar signal versus time is pre-stored in the computer memory and used to enable a software or hardware algorithm to determine the distance traveled by the locator unit, about 104 mm in this example.

A typical computer algorithm operates on a digital computer, and it determines the distance traveled by fitting a known curve shape (i.e., a "pattern") to the very distinct curve values obtained as the user moves the location unit such that peak positive, peak negative, and zero values are obtained. In the example associated with FIG. 2, two peak positive values 33 and 34, one peak negative value 35, and two zero values (i.e., "zero crossings") 36 and 37 were obtained. These values fix the free parameters of a pre-selected, mathematically described system sensitivity curve, and enable the association of the signal from the location unit with a position traveled 38. However, a second curve, of the type shown in FIG. 2 but offset in phase (see FIG. 3), is needed to resolve the ambiguity of direction traveled.

FIG. 3 shows a normal output 40 of an EM sensor optimnized for the computer input application described herein. The output 40 is identical to that shown in FIG. 2, except that a second receiver system is added to the EM sensor (see FIG. 4), which includes a phase shifter such that one half of the received EM wave signal, is phase-shifted by 90° (i.e., usually delayed by 90° or by ¼ wave compared to the normal wave). This second output 41 is called the quadrature output because its phase is "in quadrature" to the phase of the normal signal, $S_N$. This method of generating a second signal flow 41, in quadrature, is well-known prior art in the radar industry (see M. Skolnik "Radar Handbook, $2^{nd}$ Ed., McGraw-Hill), because it solves an outstanding problem of "no-signal" which occurs when receiving a "null" signal if the target is located at a "zero" in the normal signal sensitivity curve (e.g., see the sensitivity point (36) at x=105 mm in FIG. 2). After the second received signal 41 is phase-shifted, the second signal 41 is mixed, integrated, amplified, zero-base-line suppressed, filtered, peak detected, smoothed, and prepared for transmission via wire or wireless. This signal 41 is called $S_Q$, or the quadrature signal. The combination of two data streams, as shown in FIG. 3, resolves two issues that occur when only a single homodyne (i.e., normal output $S_N$) is used-the chance of receiving a zero or "null" signal from a target, and the resolution of direction of motion. In FIG. 3, the normal signal, $S_N$, reference numeral 40, shows two data points, reference numerals 42 and 43 of the same value. The arrow for point 40 indicates the direction of signal change as the locator unit is moved away from the sensor, which increases the distance x. In this case, the signal $S_N$ increases in proportion to the increase in x. However, there is an ambiguity because at the location 43, the signal $S_N$ also increases, as shown by the arrow, as the distance decreases in proportion to the signal increase. This ambiguity in direction, for two identical signal value changes $S_N$, is resolved by measuring the output of the corresponding quadrature signals, $S_Q$. At data point, reference numeral 44, on the quadrature signal $S_Q$ versus distance curve 41, the curve at data point 44 is negative in value but increases (i.e., becomes less negative) with increased distance; but the curve of $S_Q$ at the point with reference numeral 45, is positive but decreases with decreased distance (even though $S_N$ increases). By using a simple numerical algorithm (see Table 1, measure algorithm) that compares the numerical signs, the values, and the slope (i.e., the derivative) versus locator-unit motion, one can unambiguously associate an increase in $S_N$ with a distance change, and provide the direction of travel of the locator unit (i.e., toward or away from the EM sensor). See the section below on algorithms for more details.

In addition, if the signal $S_N$ is too small to be reliably detected and digitized, the algorithm can use the signal from $S_Q$ which is the quadrature output, and use it to determine distance traveled, and to compare it to the sign and amplitude changes in the normal signal to resolve direction ambiguity. A third important advantage of using the second quadrature output signal for our application is that the quadrature signal provides a second set of 5 definitive markers for determining location of the locator unit. These markers are 3 more zero crossings and 2 more amplitude peaks per cycle of RF, that are shifted by ⅛ wavelength from the normal signal markers.

The EM sensor provides two signal outputs, one normal and one in quadrature to the normal signal, and the preferred algorithm uses the outputs of both sensors to obtain the best signal-to-noise (SN) for several possible circumstances. These include the correction of partially blocked (i.e., attenuated) signals, the determination of the direction of motion of the locator unit, and the acquisition of additional zero crossings and peak values for accurate distance markers. The EM sensor system, generally designated by the reference numeral 50, is illustrated by the schematic shown in FIG. 4. An exemplary homodyne circuit of the type used in FIG. 4 is shown in U.S. Pat. No. 5,512,834 by Thomas E. McEwan, which is hereby incorporated by reference. The input triggers 50 produce output signal 53 from pulse generator 52. Transmitted wave 57 from goes toward a locator unit of type exemplified in FIG. 7. The reflected wave 58 returns to the antenna (transmit and receive) 59 and produces a received signal 56. (A single or separate transmit and receive antenna can be used.) Received signal 56 follows normal signal path 60 and quadrature path 61. Output signal 53 also follows normal and quadrature signal paths 60 and 61. These signals are processed similarly in both paths 60 and 61. In path 61, processing occurs in mixer 62, integrator 63, amplifier stage with gain and zero reset 64, output filters 65, gated integrators to sample peak signal values of short pulse features from each filter output 66, filtered, peak detected, and smoothed output of quadrature channels 67, signal formatting for transmission (digital or analog format) to computer via wire or wireless 68, plug receptacle for attaching other EM sensors to bus, from one EM sensor to the next 69, bus or communications channel to PC 70, and filtered, peak detected, and smoothed outputs of normal channel 71. An example 72 of a quadrature channel positive directed peak signal value (also called a short pulse feature is shown. It can be "+" or "−" in sign. Comparison of signal paths for normal signal 60 and quadrature signal 61 provide ⅛ cycle transit time difference 54 in each direction, leading to a total ¼ cycle phase difference between received signals following the two paths, 60 and 61.

The circuit referenced above demonstrate features of this application. The addition of an identical second receiver circuit (with a 90° phase-shift relative to the first circuit) to the circuit layouts already demonstrated in the above referenced designs, can be accomplished in other types of transmitter and receiver designs by anyone skilled in the art of modern high frequency rf circuit design and construction. Data shown in FIG. 18 was taken with a system where two antennas are used, one for transmit and one for receive. The data were processed using algorithms illustrated in this disclosure.

Figure 5:
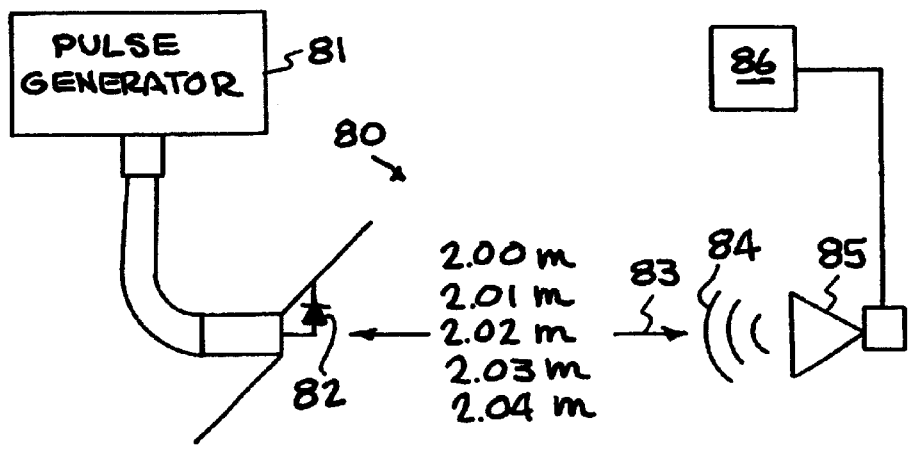
FIG. 5 shows an EM sensor and movement of the locator-unit.
Figure 6:
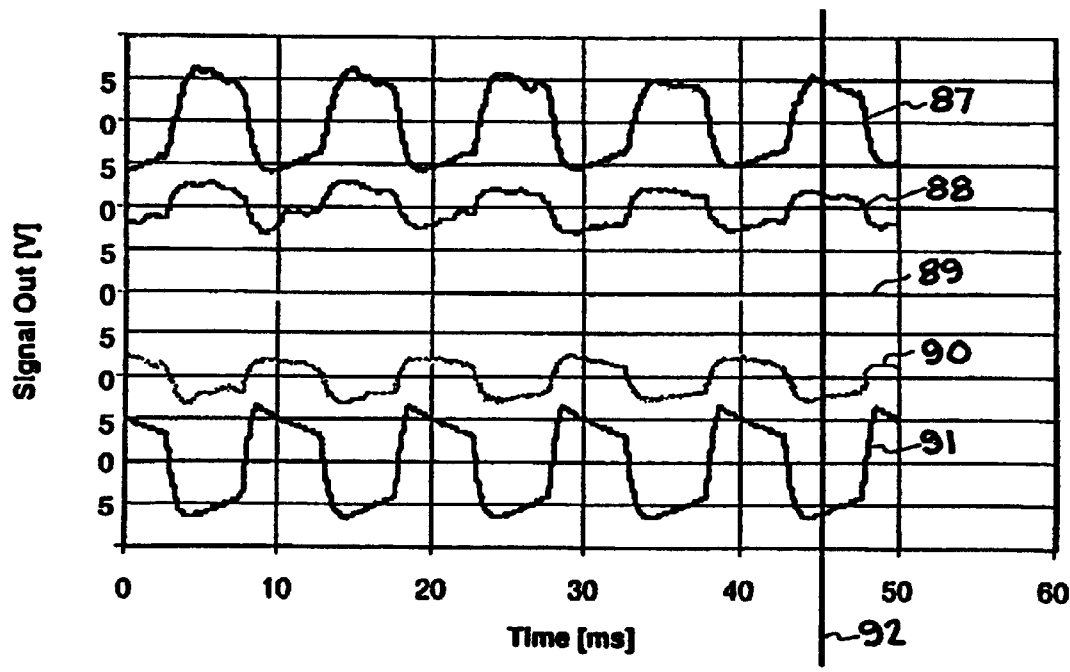
FIG. 6 shows EM sensor response to movement of locator-unit.

FIG. 6 shows the response of the above referenced EM sensor circuits as it detects the modulation of an antenna with an on-off diode switch as the unit is moved in distance away from the EM sensor in 1-cm distance steps. The constant receive phase 92 signals are shown in FIG. 5 as the unit is moved in distance 83 away from the EM sensor in 1-cm distance steps as shown in FIG. 5. The following responses are shown peak positive response 87, ½ peak positive response 88, zero response 89, ½ peak negative response 90, and peak negative response 91. The signals are from an EM sensor circuit as it detects the modulation of a reflecting antenna with an on-off diode switch 82.

Figure 7:
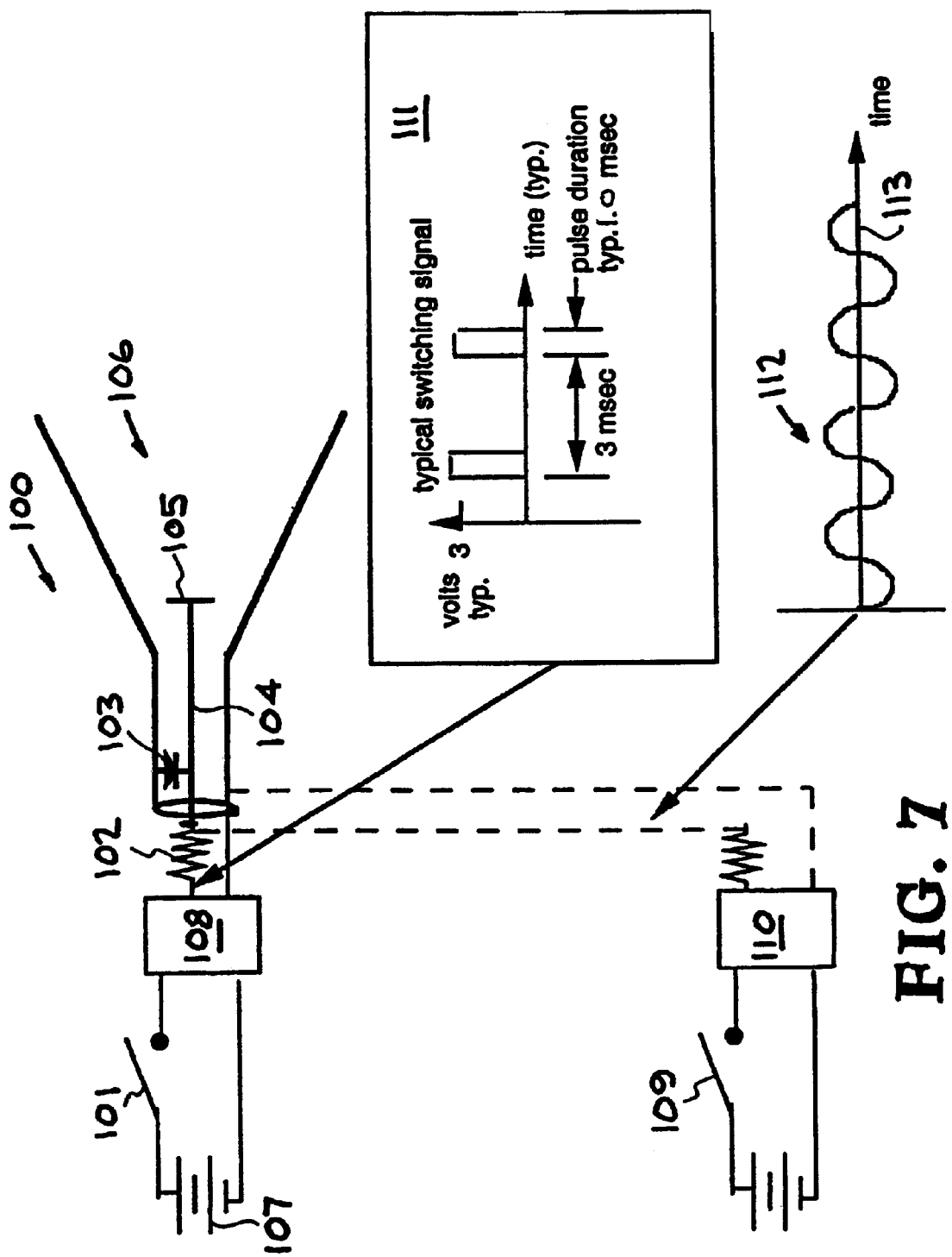
FIG. 7 shows an antenna switching unit with representative antenna.
Figure 13:
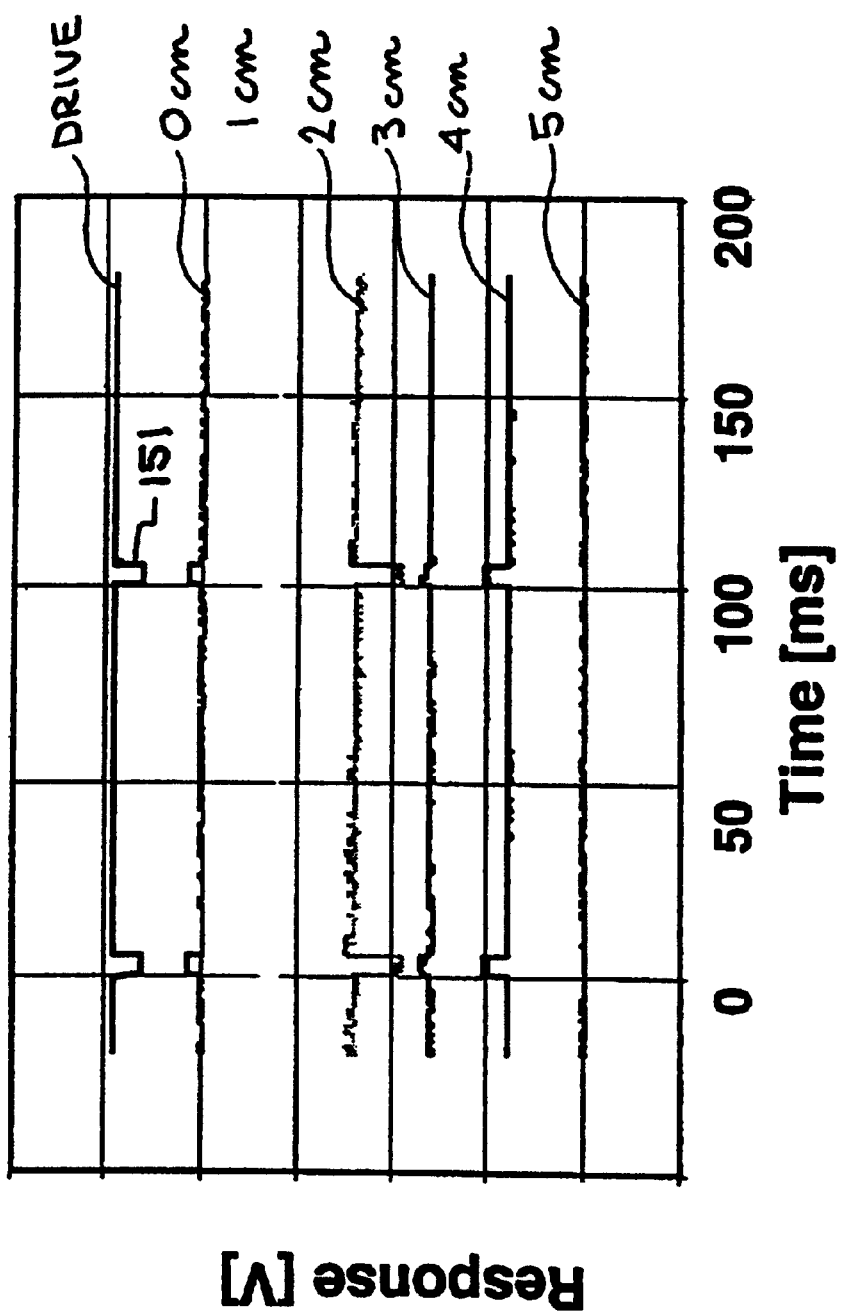
FIG. 13 shows a coded pulse shape from an EM sensor.

FIG. 13 shows a similar demonstration to the type shown in FIG. 5 but using a differently coded reflector modulation (72), of the type illustrated in the insert in FIG. 7. This antenna (which is similar to that shown in FIG. 7), the switching technique, and the data are similar to the type that would be used in the hand-moved locator unit, shown in FIG. 1. The EM sensor in this demonstration operates at 4.2 GHz; and the locator unit, for this experiment, was a horn antenna suitable for use up to 6 GHz. The output coaxial connector of the antenna, was shorted and then un-shorted, at a low frequency of 1 kHz. This exemplary antenna modulation circuit, is caused by sending a low current (e.g., a few micro-amperes at a few volts) through a resistor, and then through a diode 82, that is placed across the central and outer conductor of a coaxial cable connector. As the diode conducts (with current flow) and then opens (no current flow), the antenna reflectivity changes. The power to accomplish this switching can be lower than a micro-watt, which is easily supplied by a battery for several months to over one year of use. However, the use of a battery charger may be preferable for some users, as shown in FIG. 1, to avoid the need for battery changes.

The data in FIG. 6, show the change in signal levels, $S_N$, and signal sign (going from positive to negative) from a homodyne EM sensor as the locator unit (the diode-switched antenna) is moved away from the EM sensor, see FIG. 5. In FIG. 6, the change in signal sign and amplitude is easily observed by considering the peak signal values from each trace, corresponding to 1-cm movements, along the line of constant antenna phase. The normal signal, $S_N$, in FIG. 6, follows the homodyne sensitive curve shown in FIG. 2, and it starts at a positive peak and moves to the next negative peak as distance is increased. However, the distance scale for the sensor used in FIG. 5, is compressed by a factor of 0.54=2.3 GHz/4.2 GHz, when its output is compared to that shown in FIG. 2 (i.e., the factor of 0.54 is due to the different EM sensor wavelengths of the sensor used to generate FIG. 2, λ=12 cm, and the one used to generate the data in FIG. 5, λ=7.1 cm). This illustrates a change in homodyne pattern as the sensor wavelength is changed. The data in FIG. 6, were taken with the locator unit in FIG. 5 being placed about 15 m from the EM sensor (about 50 feet), and the active sensor power output was about 0.5 milli-watts (about 1000 times lower than a cellular telephone output). Also, the active antenna in the demonstration used even less power, typically <10 μW. This experiment demonstrates that very low power EM sensors can be used across rooms and from side to side across large projection screens.

The circuitry in this example sensor, and similar sensors, can easily meet all of the requirements of the FDA, for continuous use of rf equipment near non-expert users; it can meet FCC narrow bandwidth specifications for operation in public service bands; it meets the distance needs of potential users for hands-free "wand," for table-top "mouse" use, or for head-mounted locator units. In addition, this and similar sensors are economical to produce. They are estimated to cost a few dollars each in mass-produced quantities, because there are no moving mechanical parts (except for one or two buttons) and the electronic components in the locator units operate, almost completely at low frequencies, using very little power (<5 micro-W). The EM sensor units themselves use little low power (<50 milli-W each), and can operate using power from the host computer, or they can have their own power supply which can be plugged into a standard wall outlet.

Locator-Units and Switched Antenna

FIG. 1 shows a 2-D locator unit 11 that receives EM waves from any direction in the plane. It also modulates the reflectivity at a fixed frequency such that the EM sensor is able to measure the intensity, its sign, and the slope of the homodyne sensitive curve (i.e., it tells which zone the locator is in, as defined in FIG. 15) where the unit is located. An example unit, generally designated by the reference numeral 100, is illustrated in FIG. 13. This device 100, together with the waveforms it uses, the EM sensors, and the algorithms enable the methods and systems herein to solve outstanding problems plaguing prior-art devices. Solutions to outstanding problems and benefits of the locator unit 100 are the wireless nature of the locator unit 100, absence of any need for triggering and timing signals between the locator 100 and the EM sensor, the system's accuracy and robustness to workplace clutter, lack of sensitivity to non-orthogonality of EM sensor placement, and ease of 3-dimensional operation. Systems using modulated (i.e., switched) antennas for imparting information to reflected radar waves are shown in U.S. Pat. No. 2,193,102 by Koch and U.S. Pat. Nos. 2,539,594 and 2,823,365 by Rines.

This device 100 includes "push button #1" 101 to activate the switching unit, a load resistor 102 to limit current to the diode; diode switch 103; central antenna conductor 104; antenna 105; typical horn antenna with maximum transverse dimension about 2 to 3 times the ½-wavelength of the wave to be received 106; battery, preferably rechargeable 107; switching unit that provides diode turn-on and turn-off current, typically switching the current at 200 to 3000 Hz 108; optional button 2 109; and second switching unit with separate modulation frequency, subsystem 110. A typical primary (or first) switching signal 111 and typical second switching unit signal, a sine wave at 2 kHz frequency 112 is shown in FIG. 7.

A switched antenna 105 that is part of the locator-unit structure 100 is illustrated in FIG. 7. This schematic illustrates a typical horn antenna that is often used in microwave receivers. See Richard C. Johnson editor, "Antenna Engineering Handbook, 3rd Ed." published by McGraw Hill, 1993, for details on the antenna applications to the system described herein. For all of the antennas illustrated as suitable for the methods and systems herein, it is desirable that they be "single mode" in their absorption and reflection (with respect to the EW wave generated by the EM sensor), so that mode-shape effects do not distort the homodyne spatial pattern in the workplace, on which the methods depend. The horn antenna has a broad-band, single mode receiving capability; it is directional with nominally 5 dbi gain; it is low in cost to fabricate, and is easily used in a transmit or receive mode. FIG. 7 also illustrates a simple switching circuit that changes the reflectivity of the antenna at a frequency that matches the filter frequency pass band inside of matched EM sensor units. If desired, other switching frequencies can be used simultaneously to modulate the antenna reflectivity for reception by other EM sensors. Such switching circuits can generate the relatively slow pulse shape, as shown in FIG. 7, very cheaply (about $1 each) and do so very reliably, using little power (<1 mW). A typical diode on-off frequency, and therefore an antenna modulation frequency, might be 1 kHz, as illustrated in the data shown in FIG. 5, which illustrates a locator unit that was robustly detected by an EM sensor at a distance of 15 m.

The pulse format (i.e., coding) shown in FIG. 7, is part of the methods and systems described herein. FIG. 7 shows an illustration of this pulse shape 111. It makes possible "trigger free" measurement of the "sign" of the homodyne sensitivity curve where the locator unit is located. An important inventive feature of this application is the automated communication, timing free, between the locator's corresponding EM sensor. Pulses of the shape with the short pulse width being ⅓ of the long pulse width, 111, enable a very simple, low-cost detection circuit to be used (see FIG. 4.) to detect the maximum value and sign of the signal reflected from the locator unit. It is important that resistor 102 can have values ranging from 0 to very large, and that the pulse unit 108 can have the needed impedance modulation, internal to the unit. Thus 102 and 103 components can be inside the unit. In the preferred enablement, the short pulse duration must be shorter in time duration than the long pulse duration. The preferred EM sensor circuit, shown in FIG. 4, uses an absolute value peak detector, and a gated integrator circuit for detecting the maximum value and sign of the short-pulse "feature" and for smoothing these peaks into a "maximum-averaged" signal level. The gated integrator and signal formatting units can be analog or digital processors, depending on the application. In addition, the system triggering units that cause a transmitted pulse train to be generated and transmitted can be activated by an internally generated signal, or by an external signal sent on the "bus" that connects one unit to the next. The reason for an external trigger signal is to enable the EM sensors that measure signals from different directions to simplify the measurement of the motions of their corresponding locator-units without interference from the other EM sensors.

Alternatively, each locator unit's reflector can be modulated at two or more repetitive pulse frequencies of the type shown in 111, FIG. 7, each of which correspond to a matched filter in a $2^{nd}$ or more EM sensor-receiver system. With proper directional antennas, 2 or more EM sensors can be used at the same time.

The measured signals from the gated-integrator and signal formatting units are used by algorithms to determine the peak absolute value, the sign (i.e., plus or minus) the location of the locator-unit on the homodyne sensitivity curve, and using normal and quadrature signals, the direction of locator-unit travel. For example, see the discussion regarding the homodyne sensitivity zones (see FIGS. 14 and 15). The reason this pulse shape coding works well is that, when the EM sensors are coupled to high-pass filters (see FIG. 4), the average positive signal power and negative signal power are equal, but the short pulse peak-power, absolute-value, signal-level is much higher. Using simple modulation techniques (illustrated in FIG. 7) of generating short pulses, an antenna "shorting time" can be typically ⅓ of the on-off switching cycle. The amplitude and sign of this shorter pulse, as it is detected by the EM sensor, can be easily detected by a maximum absolute value, amplitude peak detector, a sign detector, and then integrated (if desired) to obtain a smoothly varying signal (typically <1-kHz bandwidth) that reflects the location and sign of the locator unit on the homodyne sensitivity curve.

Figure 8:
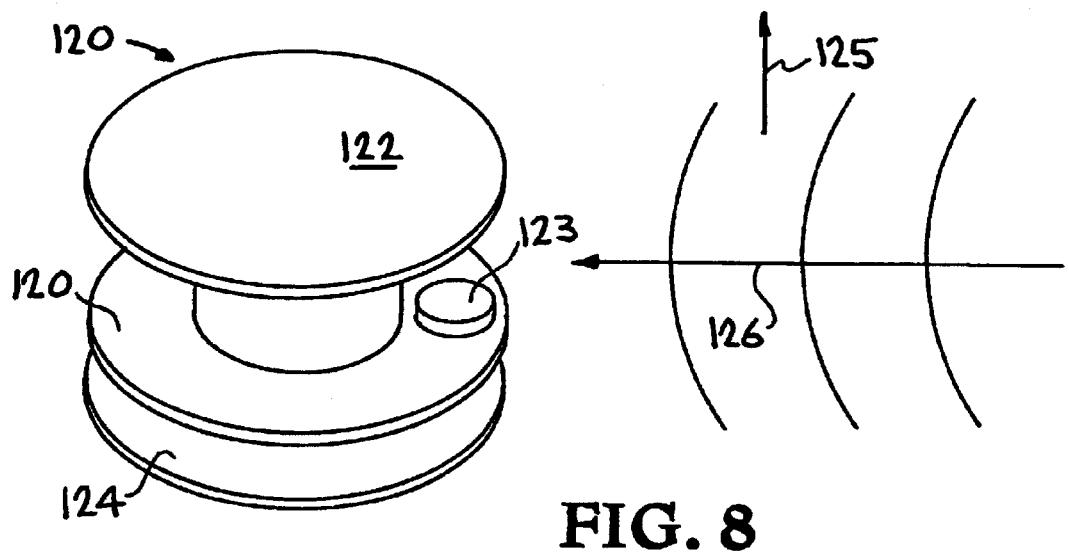
FIG. 8 shows a hand directed locator-unit with omni-directional antenna.
Figure 9:
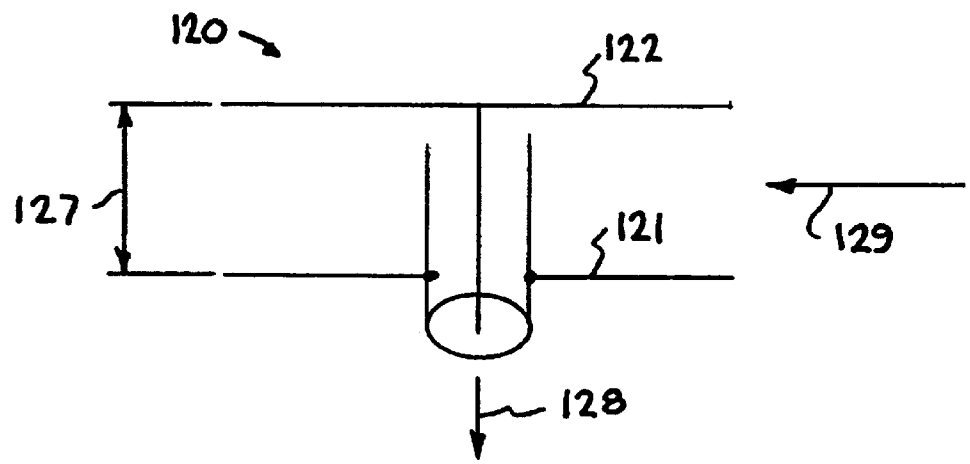
FIG. 9 shows a side view of the antenna.

A specific type of locator unit, with its specific modulation format, is used with a corresponding EM sensor (and sensing algorithms) to generate a homodyne normal and quadrature signal that characterizes the distance between the two (see FIG. 2 for a specific example). It is not necessary that each physical "pair" be calibrated, but rather that the class comprised of a specific EM sensor and locator units be calibrated for response versus distance, to meet the needs of the methods and systems herein. A representative class is determined by assembling specific electronic components into specific circuit patterns onto mechanical structures (e.g., circuit boards) into essentially "identical" systems that perform mechanically and electrically in nearly identical ways, once fabricated. Automated algorithms described in this specification elsewhere, enable the sensors and locators to be calibrated to the workspace in which they are used Other antenna designs, applicable to the wireless computer input application, are illustrated in FIGS. 8, 9, 10, 11, and 12. FIGS. 8 and 9 illustrate a circular structure, which is omni-receptive in 2-dimensions. A hand directed locator-unit with omni-directional antenna 120, is shown in FIGS. 8 and 9. It includes bottom antenna electrode 121, top antenna electrode 122, and button 123 to turn on the switching unit, and groove 124 for hand holding. A typical EM wave 126 propagating toward the locator unit is shown with E field polarization noted as the E Vector of EM field 125. FIG. 9 shows a side view of antenna120 with the top electrodes 122, bottom electrodes 121, and connecting antenna feed. The dimension 127 is ½ wave of EM wave being received (e.g., at 2.3 GHz the dimension is 6 cm). The EM wave into the antenna is shown by the reference numeral 129. The arrow 128 shows the connection to the switching unit, battery, resistor, and button.

Figure 10:
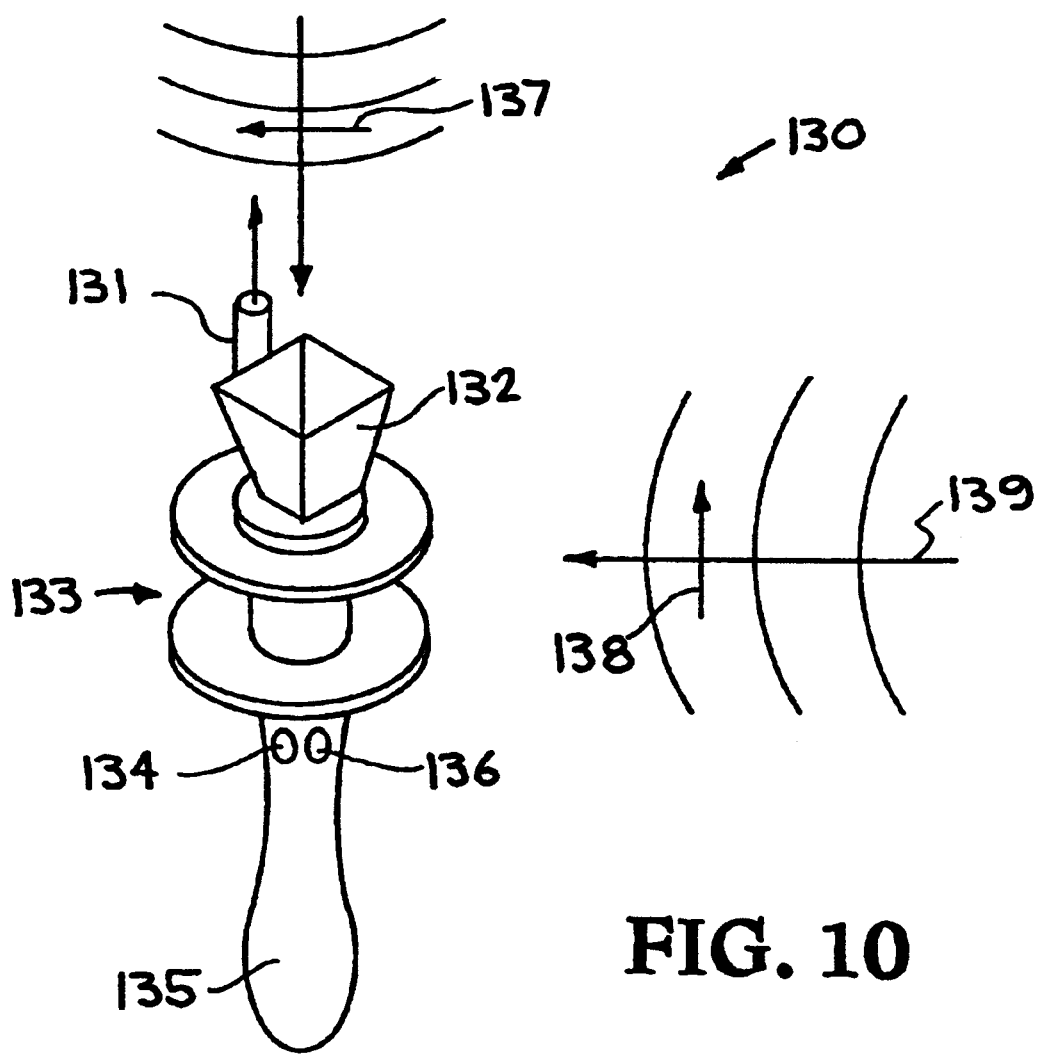
FIG. 10 shows a wand locator unit with shaped antenna.

FIG. 10 illustrates a hand-held wand 130 consisting of wand shaped antennas. A wand shaped antenna is shown for use in screen or other directing applications requiring wireless applications. It is commonly used with a laser pointer. The antennas are commonly covered with a plastic cover that is transparent to the EM waves. The wand system includes laser pointer 131; modulated horn antenna 132 for end-on distance measurement; omni 2D antenna 133 for lateral and vertical distance measurements; "button #1" 134 for modulating antennas at set rate; handle 135 with battery, buttons, and modulator units inside; "button #2" 136 for turning on laser pointer, or adding a second modulation; and frequency to antenna switching unit. A typical EM wave 139 is shown propagating toward the locator unit 130. Representative E field polarizations are shown by the E Vector of EM field 137 and E Vector of a second EM field 138.

Figure 11:
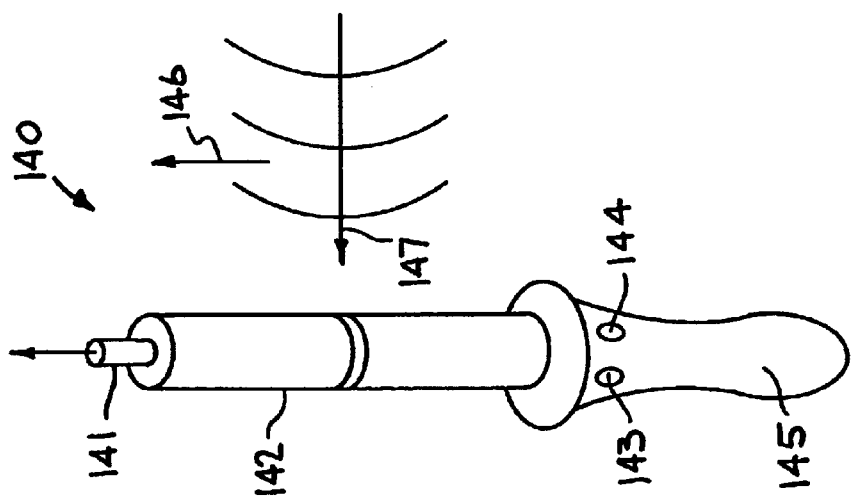
FIG. 11 shows a rod locator unit with antenna.

FIG. 11 illustrates a rod shaped antenna 140 for 2-dimensional directing of a cursor across a large screen. Commonly used with a laser pointer, and the antennas are commonly covered with a plastic cover that is transparent to the EM waves. The rod locator unit 140 includes one antenna; laser pointer 141 (optional); linear dipole antenna 142 for lateral distance measurements, with separate internal coaxial feed to handle, where typical switching units, batteries, etc., are located; "button #1" 143 for modulating antennas at set rate; "button #2" 144 for turning on laser pointer, or for adding a second modulation frequency to antenna switching unit; and handle 145 with battery, buttons, and modulator units inside. A typical EM wave 146 is shown propagating toward the locator unit 140. The E field polarization is noted as the E Vector of EM field 146.

Figure 12:
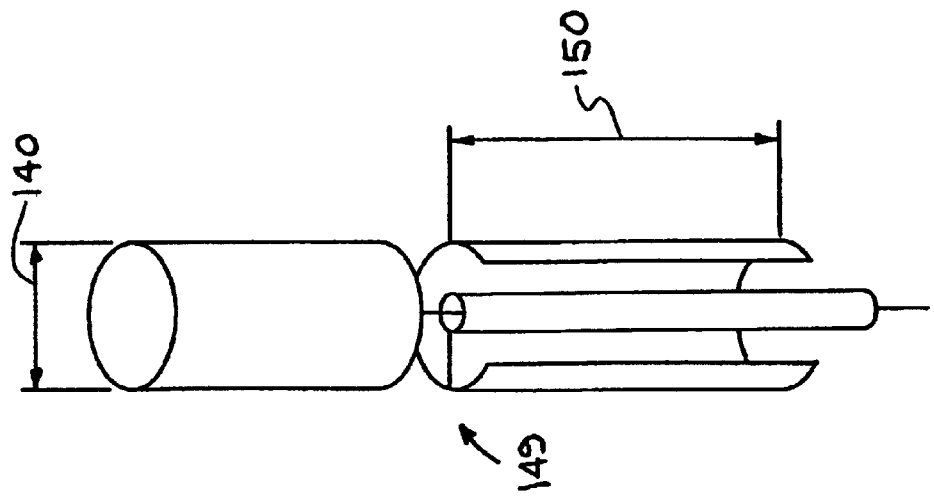
FIG. 12 shows an expanded view of a coaxial antenna.

FIG. 12 shows an expanded view of a coaxial antenna. This is an expanded view of the rod shaped antenna 140. The diameter 148 is (d<<¼λ). A typical ¼ wave dipole feed 149 is shown with a gap between elements of conventional dimensions and leads to an internal coaxial cable that is properly impedance matched. The typical dipole antenna dimension is shown as 150 (L=¼λ).

Each of these antenna locator units have their reflectivity modulated by the same type of switching unit illustrated in FIG. 7, with typical signal examples illustrated in FIG. 13. Signal strength (and therefore range) benefit from copolarizing the transmitting and receiving antennas. In other words, the antennas should be oriented similarly, e.g., "both up." System will work if antennas are not oriented similarly. Another option is to combine linear and circular polarization. Combined polarization systems are insensitive to orientation.

FIG. 13 shows a signal pulse format, coded by pulse generator modulating antenna in locator unit, and detected by EM sensor at 3 meter range. The short pulse feature is identified by reference numeral 151.

Algorithms

Figure 14:
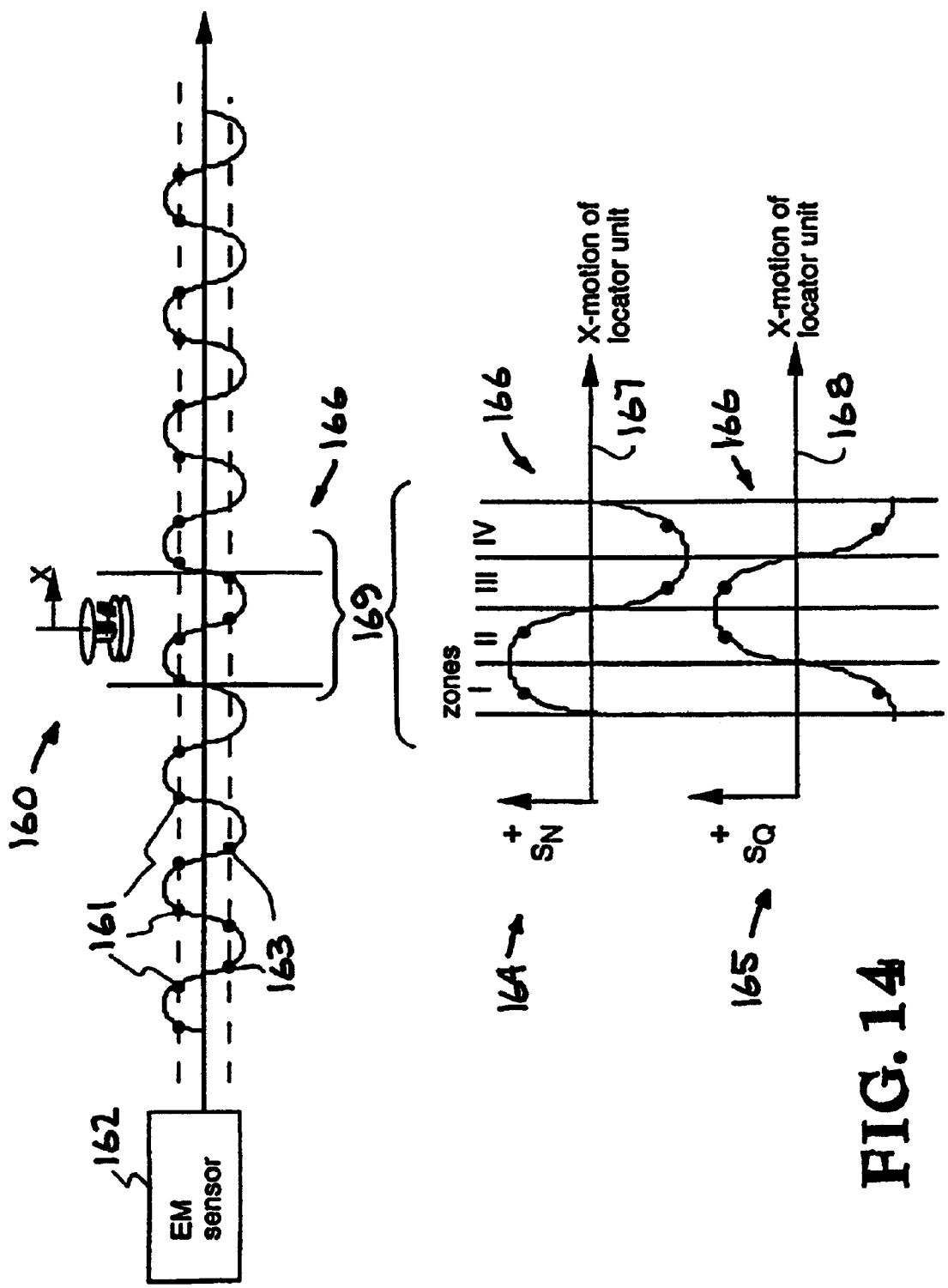
FIG. 14 shows an algorithmic typical signals and zones.
Figure 15:
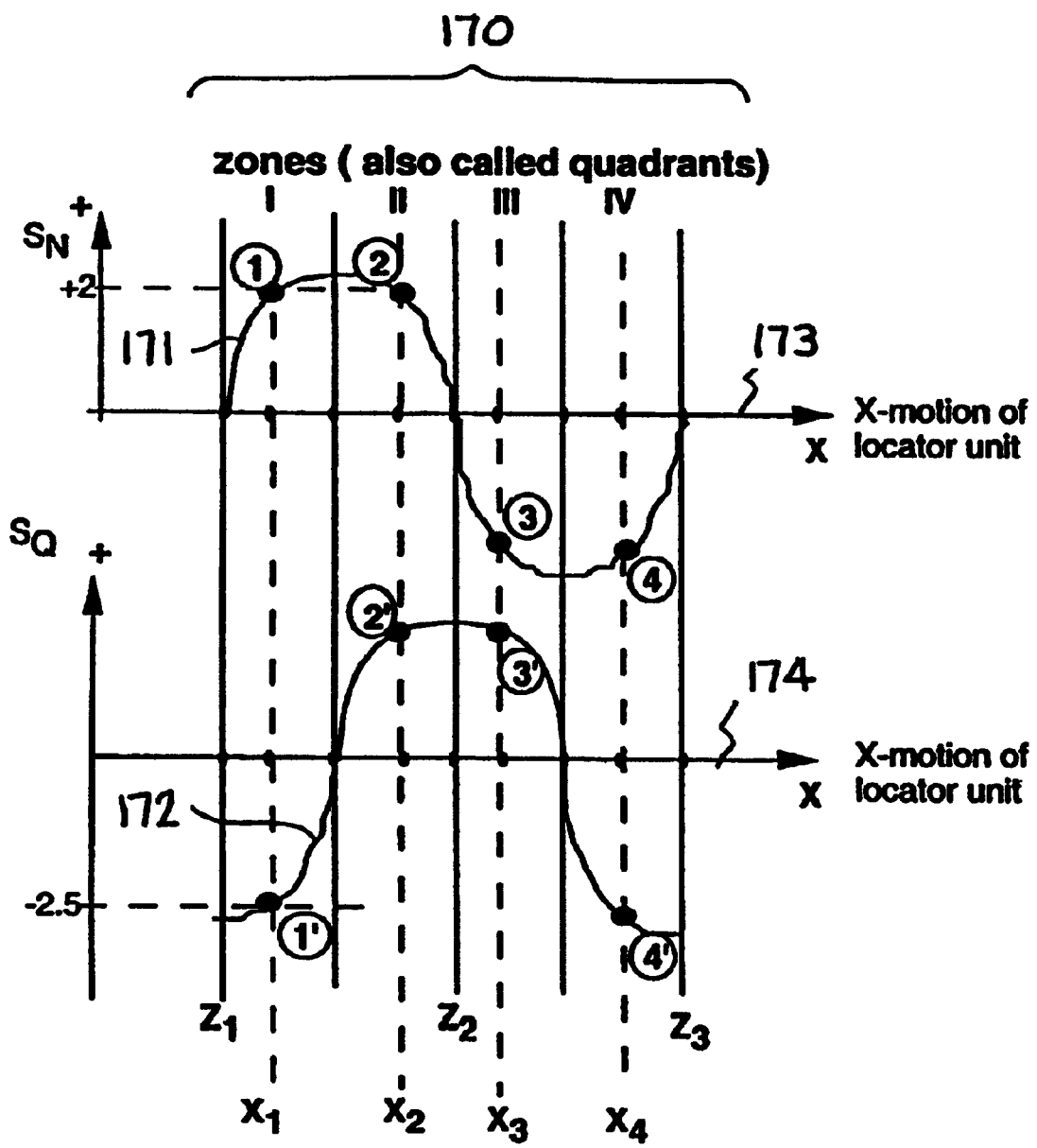
FIG. 15 shows an algorithm representative cycle and zones.

Algorithms are used to convert locator-unit motion, measured by an EM sensor, to control a computer screen icon (e.g., a cursor). FIG. 14 shows EM Sensor 162 and algorithmic typical signal levels and zones 169. (Zones are often referred to as quadrants.) Reference numeral 161 shows positive, identically valued $S_N$ signal levels. Reference numeral 163 shows negative, identically valued $S_N$ signal levels. Single cycles of normal signal, $S_N$ are designated by reference numeral 164. Single cycle of quadrature signal, $S_Q$, that corresponds to normal signal $S_N$ are designated by reference numeral 165. Representative cycles are designated by reference numeral 166. The X-motion of locator unit 167 and X-motion of locator unit 168 are shown. FIG. 15 shows an algorithm representative cycle and zones. The reference numeral 170 designates zones, reference numeral 173 designates X-motion of locator unit, and reference numeral 174 designates X-motion of locator unit. The zones 170 are also called quadrants. The single cycle of normal signal, $S_N$ is designated by reference numeral 171. The single cycle of quadrature signal, $S_Q$ that corresponds to normal signal $S_N$ is designated by reference numeral 172.

The representative single "cycle" of the normal and quadrature signals from EM sensor is shown as a function of locator-unit positions. Points $X_1$ through $X_4$, and $Z_1$ through $Z_3$ indicate the X location on the normal and quadrative X-axis of the corresponding vertical lines. Note that $Z_3$ is the last zero of the illustrated cycle, but is the first zero $Z_1$ of next cycle.

TABLE 1

Algorithm 1

Start Algorithm

Is scaling or other workspace measurement needed? If "no" proceed to measure algorithm. If yes, move cursor to home location, then press button on locator-unit and move cursor from home pattern on screen to target location, release button. Scaling algorithm uses "measurement & movement" sub algorithms below to determine distance moved, and determine scale factor, Sf, to move cursor the selected distance on screen. It also obtains data for use by correction algorithms.

TABLE 1-continued

Algorithm 1

Measure Algorithm

Measure, correct, and characterize the data:
measure output signals of sensor, $S_N$ and $S_Q$.
If there is no change in $S_N$ and $S_Q$ compared to i-1 measurement, do not store, and take next measurement.
If change has occurred, then store value and sign.
If values of $S_N$ or $S_Q$ are very small or zero, go to zero value algorithm.

| | | |
|---|---|---|
| Is $S_N$ positive? If no, go to next step. If yes, it must be like points 1 or 2 in FIG. 15 of representative cycle. | if positive → | measure value of quadrature output signal ($S_Q$), store its value and its sign. |
| | Perform operations in right hand box | If $S_Q$ negative then, note $S_N$ to be in $1^{st}$ zone with s = + slope. |
| Go to correction algorithm and return. | ← Return | If $S_Q$ is positive, note $S_N$ to be in $2^{nd}$ zone with s = − slope, store slope sign. |
| If $S_N$ is negative, thus it must be like points 3 or 4 in FIG 15. | if negative → | measure value of quadrature output signal ($S_Q$), store its value and its sign. |
| Go to correction algorithm, and return, | Perform operations in right hand box | If $S_Q$ is positive, note $S_N$ to be in $3^{rd}$ zone with s = − slope, store slope. |
| Proceed to Movement algorithm. | ← Return | If $S_Q$ is negative, $S_N$ to be in $4^{th}$ zone with s = + slope, store slope. |

Zero Value Algorithm

Are both $S_N$ and $S_Q$ values equal to zero or too low in value to use? If yes, send message to operator to say that something is blocking sensor/locator path.
If $S_Q$ is within defined value range, use $S_N/S_Q$ or $S_N/S_Q$ pattern, and/or use corrected homodyne pattern values to obtain best Xi value corresponding to measured signal value of SQi and SNi.
If $S_N$ is within defined value range, use $S_N/S_Q$ or $S_N/S_Q$ pattern, and/or use corrected homodyne cycle values to obtain best Xi value corresponding to measured signal value of SNi and SQi.
Proceed to movement algorithm.

TABLE 2

Algorithm 2

Movement Algorithm to move cursor to new location:

1. Is this the first use of the Start Algorithm? If no, go to 2. If yes, place cursor location on screen at user desired starting location, Xstart, (such as cursor home in lower right of screen, see FIG. 1). Ask user to press start button on locator unit. Measure values $S_N$ = SNa and $S_Q$ = SQa and store in vector for measurement i = start. Find the X associated with start location, Xstart, (using correction algorithm if needed), store in the vector for the first measurement. Ask user to move locator unit to target location (e.g., upper left location on screen), and release start button. Measure a sequence of $X_i$ value during movement of locator unit. Measure last values $S_N$ = SNb and $S_Q$ = SQb and store in vector for measurement i = end. Find the X associated with end location, Xend, (using correction algorithm if needed), store in the vector for the end of scale measurement.
   Determine scale factor, Sf = abs value [start-end cursor distance]/[Xend-Xstart]
   Return to start subalgorithm
2. Is this calculation for Zero Algorithm? If yes, go to 4. If no, go to 3.
3. Estimate Xi distance using signal values, $S_N$ and $S_Q$, the zone location, and the homodyne ratio curves FIGS. 16 & 17. (For example, if locator is in the $2^{nd}$ quadrant, and if the $S_N/S_Q$ = 1.6 is at dot 1, then the corresponding Xi value is X1 = 0.9, (see FIGS. 16 & 17)
   Set SNi to be $S_N$ and SQi = $S_Q$
   Use correction algorithm to correct Xi as needed.
   Store the Xi value with its vector of values that characterize this i th measurement.
4. Update the movement by setting Xi − Xi-1 = Δ Xi. Add the value Δ Xi to the cumulative movement value, sum Xi, in the feature vector for measurement i.
   Smooth and correct the cumulative movement, and replace the value sum Δ Xi with the value, corrected sum Δ Xi.
5. Scale cursor movement by multiplying corrected sum Δ Xi by cursor scale factor, Sf, to obtain scaled screen distance, and move cursor to new location.
6. Return back to algorithm which requested their movement calculation.

TABLE 3

Algorithm 3

Correction Algorithms

1. Signal attenuation with locator distance from EM sensor. Use workspace signal data accumulated during first use of start algorithm. Fit normal and quadrature homodyne curves which are multiplied by an experimentally determined functional form of signal attentuation (e.g., use a 1/(distance)$^4$ curve) to the measured data, using adjustable parameters. This will lead to a different $S_N$ and $S_Q$ homodyne function value for each Xi, as X increases away from the EM sensor unit. Each wavelength interval, defined by number of wavelengths from the sensor location, will have a different homodyne functions over it. Also, construct new ratio curves of $S_N/S_Q$ and $S_Q/S_N$ over all wavelength intervals in the work place. For each measured SNi and SQi value, determine the zone number and the wavelength interval, and then determine the Xi location by using the corrected homodyne values, SNi correct and SQi correct over the wavelength interval.
2. Homodyne pattern correction algorithm. During use of the start algorithm, obtain measured homodyne patterns. If zero crossings of the homodyne function for $S_N$ and $S_Q$ are not regular, in the sense of being multiples of ¼ or ½ wavelength of the EM wave used, it means that there is multipath distortion. Remove multipath distortion using previously measured information on types of multipath distortion in normal workplaces. Fourier transform the measured homodyne functions, determine the amplitudes of wave components that are not associated with the wave components of the best fit homodyne function, and remove said not-associated wave components. Reconstruct this corrected signal by Fourier transforming back to the spatial domain, which leads to corrected homodyne functions over each zone in each wave interval. For each measured SNi and SQi values, in known zone in known wavelength interval, find corresponding SNi and SQi, value. Use corrected $S_N/S_Q$, $S_Q/S_N$ ratio curves, and corrected homodyne curves.
3. Noise Removal: For each previously determined location value Xi, check its corresponding feature vector values with respect to those of a number, k, of immediately preceding values, Xi-k, Xi-(k = 1), Xi-1. These past data determine if the newly measured SNi and SQi, and corresponding Xi are consistent with predetermined rates of change of the values. For example, if the value Δ Xi = Xi − Xi-1 is too large for a human user to have moved the locator unit within the time interval of this measurement, then the Xi value can be rejected (i.e., This Xi is called noise). Secondly, a sequence of values SNi, SQi, and Xi can be replaced with a smoothed sequence, using well known signal processing procedures based upon the constraints of the known homodyne function shapes. These procedures increase accuracy by about 10x.
4. Return to start.

Figure 16:
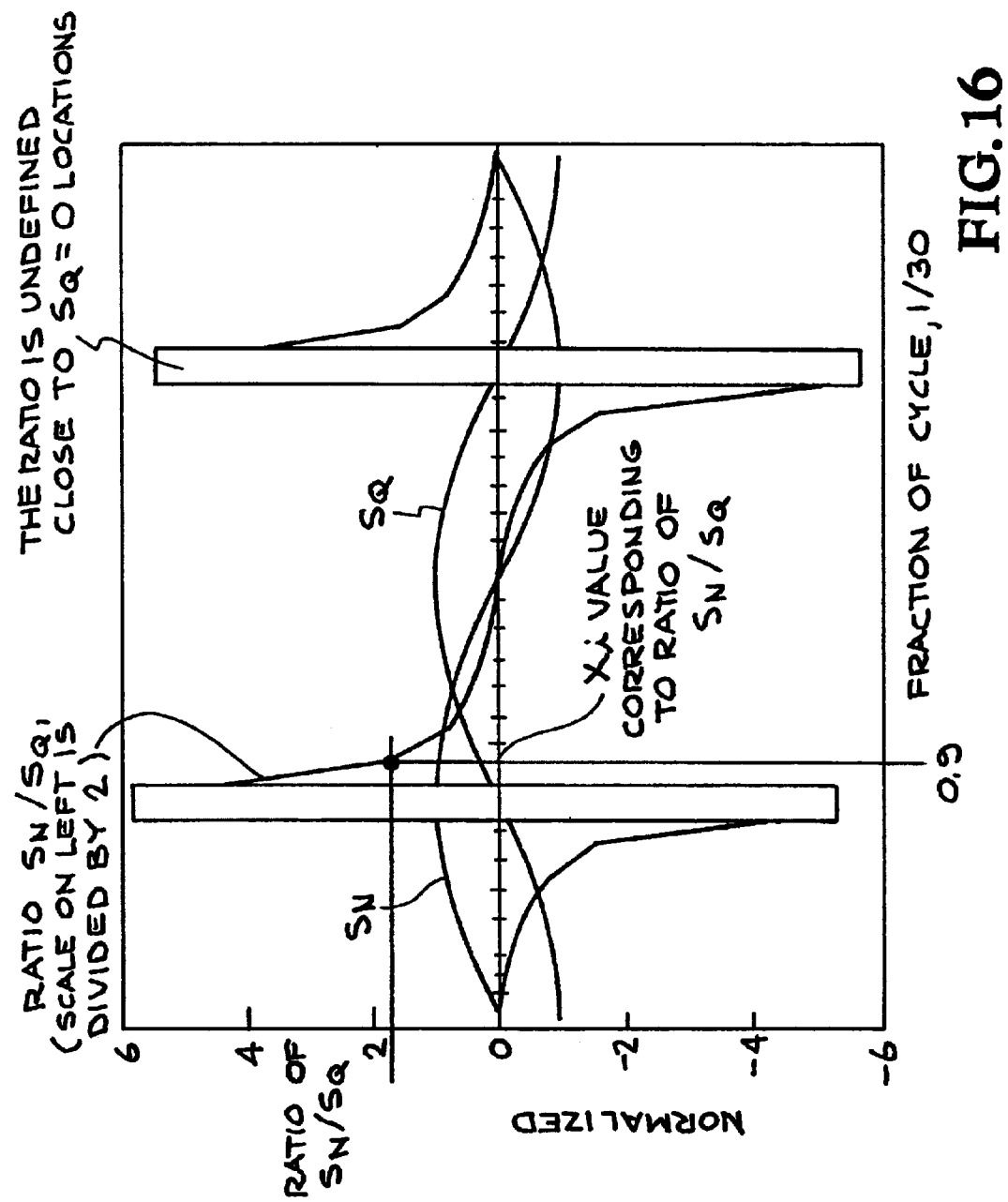
FIG. 16 shows graphs for ratio of $S_N/S_Q$.
Figure 17:
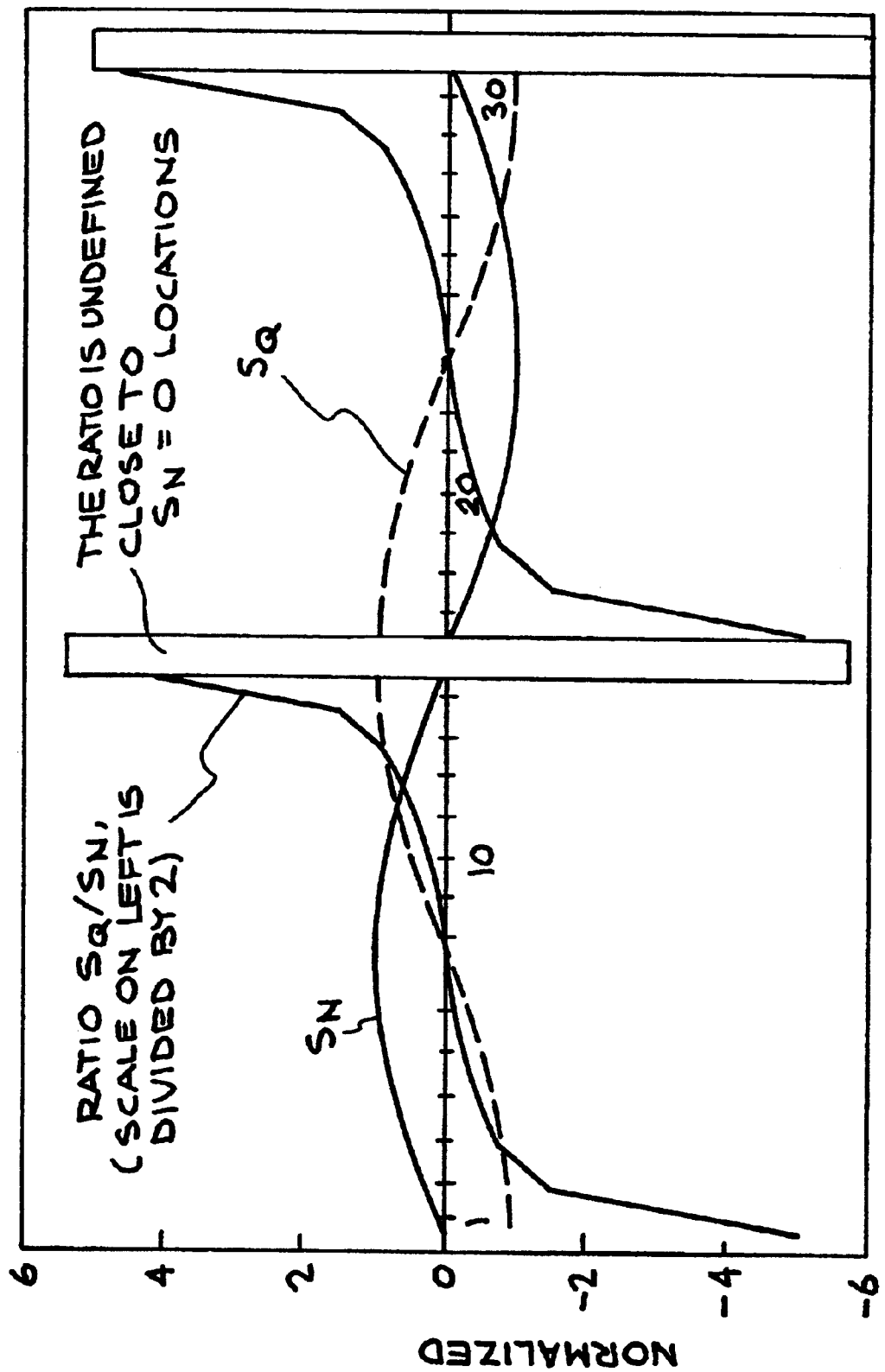
FIG. 17 shows graphs for ratio of $S_Q/S_N$.
Figure 18:
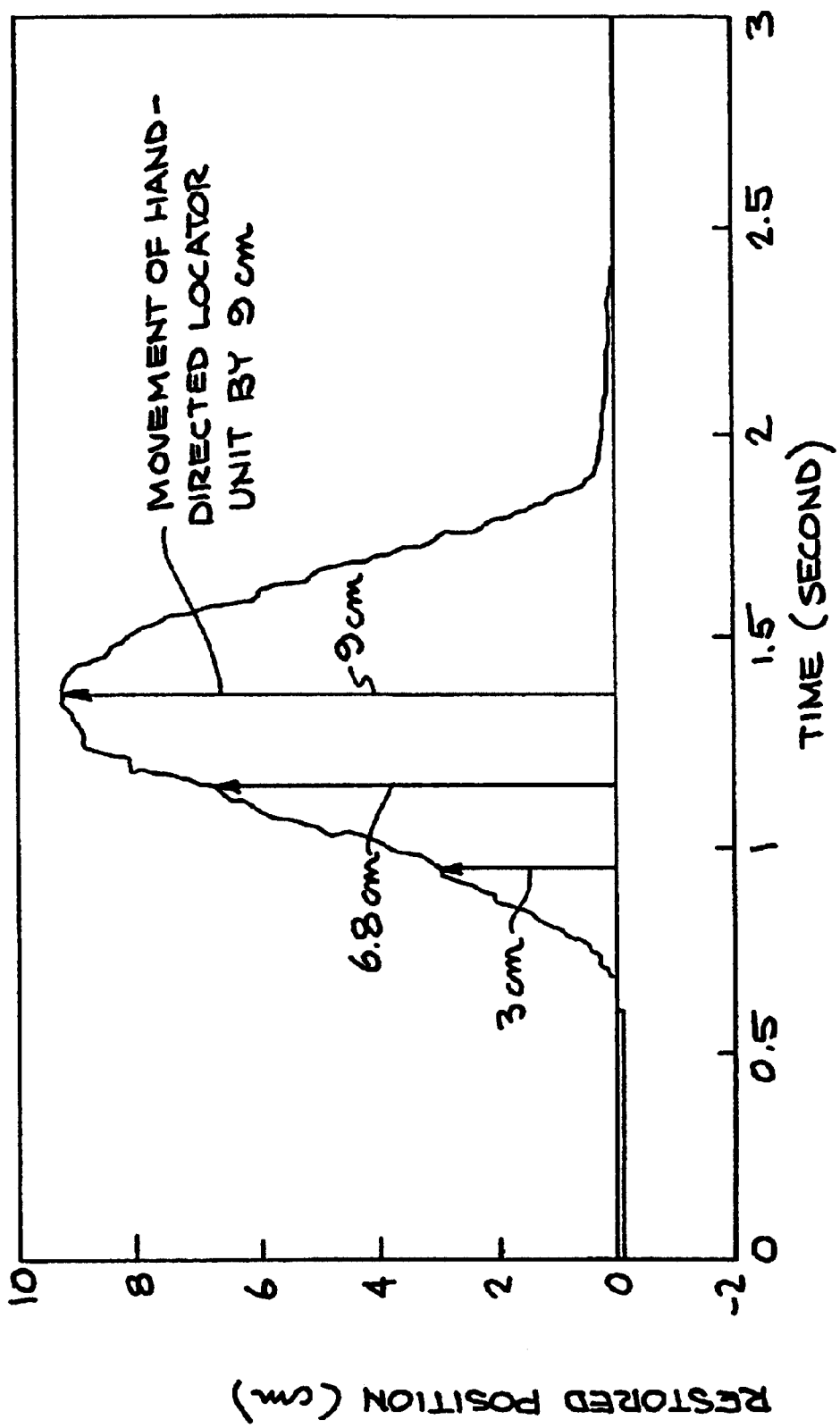
FIG. 18 shows example of algorithmic determination of a locator movement.

Table 1 shows an algorithm for scaling, measuring, and zero signals, for one dimension. Table 2 shows an algorithm for movement in one dimension. Table 3 shows algorithms for signal corrections in one dimension. FIG. 16 shows correction graphs for ratio of $S_N/S_Q$. FIG. 17 shows correction graphs for ratio of $S_Q/S_N$. FIG. 18 shows an example of a hand-moved locator unit from a rest position, to a distance 9 cm and then returned to the original position, over a time period of about 2 seconds.

The algorithms are used to convert locator-unit motion, measured by an EM sensor, to control a computer screen icon (e.g., a cursor). The applications of the systems (enabled by the inventive concepts described herein) range from table-top mouse-like motion to large-scale cursor motion on a screen. The illustrative algorithms below are described as if they were to govern the performance of one EM sensor and its corresponding locator unit. Algorithms for a system, using two or more EM sensors and locator units at a time, are the same as for a single unit (except where noted). However, it is desired (in one embodiment) that the EM sensors (if using the same transmission and coding frequencing) be timed so that they provide minimal interference with each other. Also, it is preferred that two or more algorithmic processes be completed to obtain relative motion for each of two dimensions, then scaled, and sent to an operating system algorithm that accounts for the lack of orthogonality of two or more sensors, and then directs cursor motion in two or more directions on a screen. However, for some applications, the system can be precalibrated.

An EM sensor/locator-unit system is usually configured in one of two ways. The first, configuration 1, is to detect any locator-unit motion as soon as the computer is turned on; that is, the locator-unit reflector is being modulated at all times until it is purposely turned off. In other words, it works as a prior-art mouse (where the cursor is always linked to the mouse movement). Configuration 1 works well for the prior-art roller mouse because the roller mouse can be disengaged from the screen cursor by simply lifting the device off of the surface on which it is rolling. However for EM-sensed locator units described herein, the lifted locator unit still reflects EM waves back to the EM sensor. For applications herein of configuration 1, a button on the locator unit is pressed by the user to disengage the modulation of the antenna (i.e., to turn it "off"). In this way the unit can be moved to a more convenient location in the workspace (without "dragging" the cursor to an undesirable location); and then by releasing the button, the locator unit resumes cursor control.

The second preferred configuration (configuration 2) is one in which the locator unit's antenna-modulation unit is not activated until a button on the locator-unit is pressed; that is, the unit is normally "off". Therefore, it is not directing cursor movement until a button on the locator unit is pressed to enable an "on" condition. This configuration is convenient for use with large screens on which a user may wish to locate his or her "resting" cursor, and then purposefully move it to a new location. Either configuration, as well as others that readers can configure for their own purposes using the inventive teachings herein, are enabled by the methods and systems described herein. In addition, the type of configuration may be selected by the user by going to a screen control menu and selecting the configuration desired.

Four general types of algorithms are used as part of the system described herein (see FIGS. 14, 15, 16, 17, and 18 and Tables 1, 2, and 3). They are set-up (i.e., or "start") algorithms, measurement and data preparation algorithms, cursor movement algorithms, and correction algorithms. An example output, FIG. 18, is also shown. Unless otherwise noted, it is assumed that the system will be used in configuration 2 described above, which means that the user will push a button on the locator unit to engage the cursor and to cause the cursor to move in proportion to the motion of the locator unit. The term sub-algorithm is often used herein to describe specific algorithm processes such as "start," "measure," "correct," "zero," and "movement."

The first algorithm type (i.e., the "start algorithm") is used to set the scaling of locator-unit movement, which is dependant upon the workspace size, that is in turn determined by the user's body extension capacity, or comfort of the user. The workspace extent also influences the preferred EM wavelength to be used in the EM sensors, and it influences the signal fall off with increased distance between the locator unit and the EM sensor (which can be corrected as needed). In addition, the locations of two or more EM sensors, within their workspace, determine the degree of orthogonality to each other, and causes the scale factors to be different for locator-unit motions in different dimensions (i.e., directions) and locations. In addition, any excessive multi-path noise effects, or EM wave signal level changes with distance from the EM sensor can be detected and used to "correct" the "master" homodyne pattern to accommodate the actual pattern in the actual workspace configuration.

A second algorithm is used to measure and prepare the data. This algorithm is commonly in two parts. One part is in the sensor and the other is in the computer. It obtains the signal data, digitizes and filters it as needed, peak detects, averages, and formats as needed, and stores it in temporary memory locations. This sub algorithm often makes use of other algorithms of type 4 (i.e., correction algorithms and "zero algorithm,") to correct the data for known distortions in the EM wave pattern in the workspace and for low signal values. It places this corrected information and other information in a feature vector for each measurement event noted by the subscript i.

The third algorithm, "Movement of Cursor," takes data from the measurement/preparation algorithms, and uses it to determine the direction of the locator unit, its updated physical location, and it updates the location of the cursor on the screen. The methods herein, except where noted, do not describe algorithms that format data for transmission to the computer or to other processor. It uses prior-art algorithms for these purposes. The parts of the Measurement and Preparation algorithms which are located in the sensor package are of this prior-art type.

A fourth type of algorithm, correction algorithms, are used to correct the signal values, and the corresponding $X_i$ locations, for problems that can occur during use in real-world workspaces. These include obscurations of the EM waves as they travel to the locator-units and during their return, and EM wave amplitude attenuation with distance from the EM sensor. In addition they correct for multi-path reflections of the transmitted waves that sometimes distort the homodyne-wave pattern compared to that of a single co-linearly propagating EM wave, from the EM sensor to the locator unit and back is a clutter-free environment.

A start sub-algorithm is provided to enable the user to scale the desired workspace motion to the cursor motion on the screen, and to initialize the algorithms and clear the memory. The data that is processed by the algorithms correspond to sequences, i, of sampled signals (e.g., $S_{Ni}$ and $S_{Qi}$) from the EM sensors. An exemplary start algorithm, using a conventional "mouse-like" operation, would ask the user if he/she would like to change the scale factor of the workspace or the sensitivity of hand directed motion to cursor motion. As an example, if the user wishes to initialize or update the scaling, the computer might direct the user to move the locator unit to the front-right edge of the desired workspace, at which point the user would press the button, to engage the cursor located at the "home-pattern" illustrated in FIG. 1 in the lower right corner of the monitor screen. The user would hold the button down, then move the locator-unit to the desired edge of the workspace at the rear-left corner. Upon reaching this rear-left location, the button would be released and the computer would cause the algorithm to change its internal scale such that the cursor would move to the upper left corner of the screen. During the movement of the locator, a sequence of many data values will have been obtained, which are stored in memory for use by other correction algorithms. After additional queries from the computer, asking the user if he/she is satisfied or wishes to change scale some more, etc., the system proceeds to use the "movement algorithm."

The system's scale factor enables the user to use the wireless locator unit to move a cursor around the screen, just like a prior-art roller mouse is used, or to use it in the inverse mode with cursor engagement only upon button pressing. The scale can be changed just as today's user changes prior-art movement sensitivity by going to the "controls panel," selects the "mouse control," and increases or decreases sensitivity, speed of response, etc.

Data Measurement and Movement Algorithms

The movement algorithm must determine and keep track of a locator unit (in one or more dimensions) using a signal that is only uniquely defined over one EM wave cycle (e.g., 7 cm for 4.2-GHz units). In addition, there can be direction ambiguities, and a signal intensity at the locator unit that varies in distance in proportion to a constant $1/x^4$, where x is the distance from the EM sensor to the locator unit.

The essential operation of the movement algorithm, which is one of the primary inventive features of the methods and systems herein, is that the algorithm finds "relative" distance traveled as a user moves a locator unit "all over" the workspace. The algorithm finds a start location and determines direction of motion corresponding to the subsequent signal increase or decrease relative to the initial signal (i.e., using the slopes). Then the algorithm waits for a new signal corresponding to a change in locator position relative to the previous position, determines the best estimate of its new position, then tells the cursor to go to the new location. It does this approximately 10 to 1000 times per second, depending upon the application.

Several algorithm conventions are used in the detailed descriptions below. Most of these conventions are known to those skilled in the art of designing types of algorithms that take measured data and convert it into acceptably accurate, smoothed data for computer display, and thus these conventions are not described in detail herein. Those described herein are illustrative techniques for the preferred algorithm, which can be easily changed or modified, but still will follow the instructive principles of the algorithmic processes described herein. It is assumed that the computer (or digital processor) can accept data in many ways; however it is assumed for purposes herein that the digital processors used (located either in the EM sensors or in the processor can respond, digitize, peak detect, smooth, format, scale, and command the cursor to move at a rate that is faster than the user-directed motion of the locator unit. This rate can be as fast as a few meters per second (a few millimeters per millisecond) for wand-directed motions on large projection screens, or as slow as a few millimeters per 100 milliseconds for hand-moved locators operating as a computer mouse. For example, see FIG. 18. This means that in order to follow millimeter motions in a few milli-seconds, the digital processor must respond to a new signal; and it must complete an algorithmic procedure through a complete numerical cycle, as approximately every 1 ms to every 10 ms the cursor is moved to a new location. These rates are already accommodated with prior-art mechanical mouse input devices; thus the data input and processing is not considered further here.

It is further assumed that when the words "S-value," "$S_N$ value" or "$S_Q$ value" are used, unless otherwise described, it means that these are the most recent signal values from the EM sensor. They mean the same, except where noted, as the values $S_{Ni}$ and $S_{Qi}$, meaning the i-th and last measurements. After each measurement is made, the algorithm associates a feature vector with each of the "S-values" which contains characterizing numbers such as (2, +, 2.5, −, 1.9, 0.9, +, 4, 32.9, 100, 1). FIG. 15 shows an example set of $S_{Ni}$ and $S_{Qi}$ data that corresponds to this example vector. The values of $S_N$=2.0+ and $S_Q$=2.5− are associated with dots 1 and 1' in FIG. 15, which define a distance along the homodyne curve noted as $X_I$. The slope of $S_N$ is positive, meaning that as the values of $S_{Ni}$ increase (as more measurements, $S_i$, are made) the corresponding $X_i$'s increase. If the wavelength of the EM sensor were 8 cm (about 3.7 GHz), the $X_i$ value would correspond to an absolute distance of about 0.9 cm into the cycle. This exemplary vector usually contains the following information. The absolute value $|S_N|$ of the normal EM sensor measurement (e.g., 2), the sign of the measured value (e.g., +), the corresponding quadrature absolute signal value $|S_Q|$ (e.g., 2.5), its sign (e.g., −), a corrected value of the signal (e.g., +1.9), the $x_I$ location in cm (e.g., 0.9 corresponding to the corrected $S_N$ value using the homodyne sensitivity ratio curve; FIG. 16). This example, the ratio of $S_N/S_Q$ or $S_Q/S_N$ (see FIGS. 16 and 17) is used, depending on the zone of validity, to determine the X location (e.g., in FIG. 16, X=0.9 cm). Also, it includes the slope of the measured $S_N$ and $S_Q$ values with increased distance from the sensor (e.g., +), the number of cumulative homodyne cycles in the positive or negative direction traveled over the past measurements of 1 through i (e.g., +4 cycles), the cumulative or sum of all $x_i$'s traveled over all measurements since turn on plus new value (e.g., sum $X_I$=4 cycles times 8 cm/cycle +0.9 cm=32.9 cm), and the number of measurements, i, since starting (e.g., 100), and the zone, 1, in which the locator is positioned. Additional numbers may include the screen cursor coordinates corresponding to the location, $x_I$, the estimated absolute location, $X_I$, of the locator unit in the workspace at the time of measurement, the elapsed time T in seconds since the "on" button was pressed, and others.

Several illustrative signal and location correction algorithms are described in Table 3 and FIGS. 16 and 17. These are an important part of the inventive methods described herein. They correct for the fact that a change in hand position relative to the locator-unit, or finger motion can change the return EM wave amplitude, as measured by the EM sensor, by several percent. This accidental change would be converted to a change in the screen position of the cursor unless the corrective processes herein were used to test and correct for such changes. Other correction algorithms in Table 3 use the pre-measured shape of the homodyne sensitivity function to provide correction information, or they use shapes corrected for distance. In particular the preferred algorithms use the ratios of $S_{Ni}/S_{Qi}$ (FIG. 16) and $S_{Qi}/S_{Ni}$ (FIG. 17) to perform the amplitude correction. If the measurement algorithm, Table 1, detects that one of the $X_I$ values is near a zero $Z_I$, this tells the algorithm that the slope of one of the S value curves (e.g., $S_{Ni}$ vs. $X_I$) is low in value but very steep in slope, and that the corresponding S value (e.g., $S_{Qi}$ vs. $X_i$) should be near a maximum, and thus its slope is weakly varying with $X_i$. In a "zero crossing" region, the $X_I$ value change can be determined in several ways. One is to note that while one S value =0, the other is a slowly varying S value. The "slow-S" value can be used to find Xi.

If the S value is not small (e.g., S not <0.05 $S_{max}$), then the ratio of $S_N$ to $S_Q$, or vice versa, is formed (see FIGS. 16 and 17). If there is a partial obscuration both the $S_{Ni}$ and $S_{Qi}$ values will change in the same proportion (i.e., their ratio will be constant compared to previously measured values, indicating no change in $X_I$). This ratio procedure is an inventive improvement on using the individual S-values obtained from the homodyne sensitivity curve used (see FIG. 15 for illustration) to find distance. By finding the ratio value on the appropriate curve (e.g., see example in FIG. 16 for $S_N$) the algorithm then determines the corresponding $X_i$ value. Note these inventive methods also correct for the signal changes with signal fall off versus distance. This ratio algorithm is the preferred method to find locator-unit $X_I$ position versus S values, as described in Table 2.

An important correction is used when the sensor's antenna pattern is divergent, or if the locator-unit is many wavelengths from the EM sensor, the absolute values of the signal levels will be different than those obtained when the locator unit was a few wavelengths from the EM sensor. These changes can be detected in the start phase, using algorithms of type 1, and will use pre-stored information in the algorithm and correction formulas for the types of EM sensor and locator-unit being used. The correction procedure is applied by keeping track of the approximate location of the locator-unit, as it is moved during the coarse of a cursor direction event (i.e., data which is placed in the S-value feature vector). By knowing its movement through the workspace, a corrected "master" homodyne curve of amplitude values versus $X_I$ values (appropriate for the distance of the locator-unit from the EM sensor) can be applied as needed. This enables a correction to be made to the data so that it reflects actual position in the work space (relative to its start position). In addition, using the methods of the paragraph directly above, varying EM sensitivity can be "ratioed" out by using curves in FIG. 16 and 17.

Illustrative algorithmic procedures that describe how signal values are obtained using the system components described herein, and how they are converted first to locator-unit X-direction movement, and then to cursor movement are shown in Tables 1 and 2. These algorithms use illustrated data shown in FIGS. 14, 15, 16 and 17 to determine the values shown in the illustrative vector in the paragraph preceding this one. Real time corrections to these data are made using algorithms in Table 3 and FIGS. 16 and 17. Real data, such as that shown in FIG. 2, are not as perfect as the illustrative data shown in FIGS. 14 and 15. The lack of perfect symmetry of the experimental data is often due to imperfect components and lower-cost circuits, such as unbalanced mixers. These distortions can also be due to "multi-path" effects that distort the expected homodyne pattern. However, by making experimental measurements using characteristic locator units and EM sensors (either before the system is installed, or during the start phase), measured data can be stored in the algorithm memory as the "master" homodyne curve. This measured data can then be used to correct algorithms that determine the movements of the locator unit.

Alternatively, calculated corrections can be made for EM wave amplitude fall-off versus distance from the transmitter and corrections can be made for "multi-path" waves that distort the single-wave homodyne pattern. These are straightforward to employ because the functional forms of these distortions can be measured ahead of time using a prototype system, and the inverse-functions can be built into the correction algorithms to remove the distortions. For example the "amplitude distortion" occurs because the measured signal level falls as $1/(distance)^4$ which is significant over several wave cycles. The multi-path distortions occur because EM waves from the transmitted EM sensor bounce off of nearby objects and reach the locator-unit, appearing to the locator unit as part of the direct wave path. However, they distort the zero-crossing location as the locator unit is moved through the work place. These can be removed by filtering the measured spatial pattern to determine those patterns which do not produce the regular, ¼λ patterns of the homodyne sensor (see FIG. 2), and then those distorting patterns can be removed from the measured signal patterns using well-known inverse techniques. In addition, these effects can be reduced by using more directional antennas for specific workspace applications.

A general algorithmic comment is that the algorithmic procedures indicate that many values of $x_I$ are automatically obtained (up to a 1000 per second). In most cases, the algorithm may save only a few of them (perhaps the preceding 10 to 100) to perform adequately for the user's chosen application, or it may save those values corresponding to uniform x-movements of the locator unit. These data points can be measured every fixed time duration, by using a fixed timing unit to cause a measurement unit (e.g., A/D converter or an analog sample-and-hold unit) to make a measurement that is then sent to a processor or to a memory. They can also be obtained "on demand" by using a trigger from the computer or from an electronic circuit that determines that a locator-unit has moved a distance determined by a predetermined threshold, and a new measurement is needed.

Algorithm Comments

The present invention provides a system for controlling a computer display in a workspace using antenna. The system includes EM sensor transmit units and EM sensor receive units. The EM sensor transmit units and EM sensor receive units have internal phase reference, amplitude modulated EM wave reflectors. Algorithms convert the relative distance traveled information to display signals. Algorithms for movement determination use methods based upon interferometric signal patterns and signal correction for controlling the computer display are included. The system includes the steps of sending out a train of EM waves to flood the workspace, receiving EM waves that are reflected from the antenna, using the EM waves that are reflected from the antenna to create a relative "distance-moved" information signal, using algorithms to convert the relative "distance-moved" information signal to a display signal, and controlling the computer display in response to the display signal.

In another embodiment the algorithms include algorithms for correcting spatial frequency patterns for possible distortions, for signal noise, and include algorithms that format information for transmission to the computer for desired purposes of control or display. In yet another embodiment the algorithms include a coded modulation format consisting of one or more combinations of a shorter pulse of larger amplitude and of one polarity, followed by a longer pulse of lower amplitude and opposite polarity. In another embodiment the algorithms include an algorithm consisting of a logic process for obtaining the relative movement of a locator unit. In another embodiment the algorithms include a relative motion algorithm that determines locator position within one wavelength distance by comparing the EM sensor signal values to a normal and quadrature homodyne function pattern of expected signal values versus location in a work space. The algorithms may include pattern correction algorithms that first measure the normal and quadrature homodyne functions in the work space, process the data to determine if corrections processes are needed, and then store the first-measured function values versus position and also store corrected patterns for subsequent use.

System Comments

While the general principles of cursor direction using the methods and systems are described above, variations in the EM sensor, its corresponding locator units, the algorithms, and the connections to the computer processing units will vary depending upon the specific application. For example, the table-top operation works best with higher frequency EM sensors (e.g., 4.2 GHz which provides markers approximately every 1.7 cm) for increased resolution in a smaller workspace. This EM sensor would transmit a fanned-out EM wave beam in the x-y dimensions facing the locator unit. In the latter operation mode, a button press engages the locator, and cursor motion ensues. The algorithm would be optimized for sub-millimeter-distance movements, over the smaller workspace.

In the example where a large screen is to be controlled by one or more wand locator units, a lower-frequency EM sensor would be recommended (e.g., a 910-MHz unit) with nulls at 16 cm, and markers every 8 cm. The EM sensors would be used with more directional antennas for longer ranger operation, and would be fit with output filters to accommodate several users. In addition, the algorithm would handle many wavelengths of distance travel, and thus it would be optimized for accuracy over large-scale motions.

Table Mounted Input System

The system 10 shown in FIG. 1 consists of a collective interaction of several devices, which are designed to work together as described herein. System 10 includes a hand-moved locator unit 11 with optional light-signal source 28, two EM sensors with algorithms to format the data for wired or wireless transmission 13 and 14 and with optional light sensor 29, a useful but optional locator-battery charging station 18, a computer processor 16 with digital algorithms, a computer monitor 17, and a keyboard 22.

Head Mounted Input System

Figure 19:
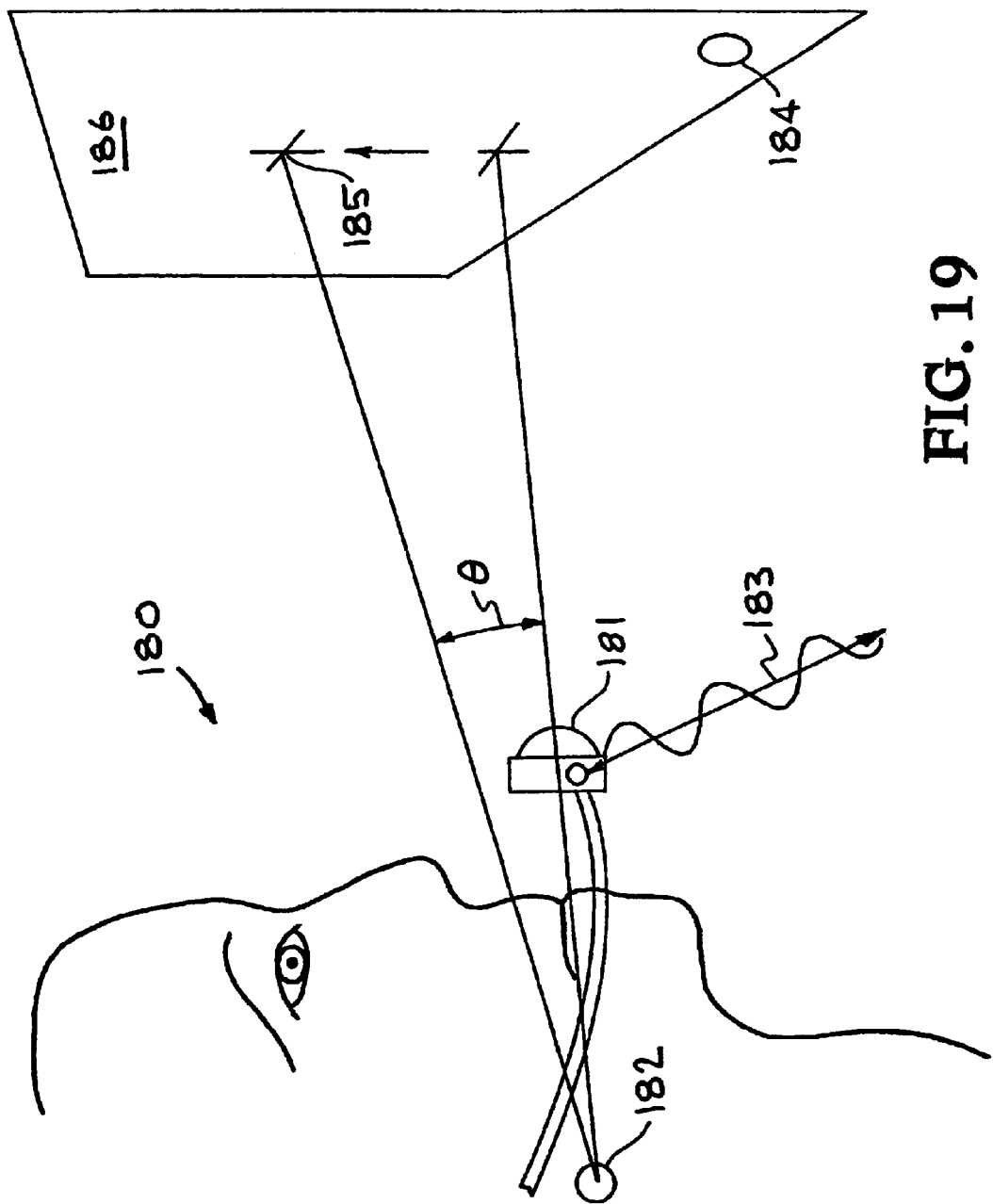
FIG. 19 shows a head-mounted locator unit and vertical dimension.

FIG. 19 shows a head-mounted locator unit, generally designated by the reference numeral 180, and aspects of the vertical dimension. FIG. 10 shows a head-mounted locator unit, generally designated by the reference numeral 190, and aspects of the horizontal dimension. The head-mounted units shown in FIGS. 9 and 10 enable a user to move a cursor around a monitor screen just like he/she does using a mouse, but moving the head. The systems have many advantages for disabled users or persons with repetitive motion disorders. They enable the person to input information such as cursor movement without using the hands. By adding speech recognition, via a microphone on the head-worn device, "button-like" commands can be inputted into the computer. In addition, such a device takes up less space in a workplace; it will not suffer wear problems as does the rotating ball in a mouse which leads to uneven motion; and it is compatible with advanced information inputting into the computer using conventional or advanced voice recognition.

The head-mounted locator unit 180 and aspects of the vertical dimension are illustrated in FIG. 19. The locator unit 181 includes an antenna mounted to a boom with a microphone. The normal axis of rotation of head on neck in a vertical plane is identified by the reference numeral 182. Incoming and reflecting EM wave 183 from homodyne radar unit located below the user's head (e.g., near keyboard) is shown. The cursor home location 184 is shown on the monitor screen 186. The cursor 185 moves up as head rotates back. Feedback is provided by user's determination of cursor/target relative location.

Figure 20:
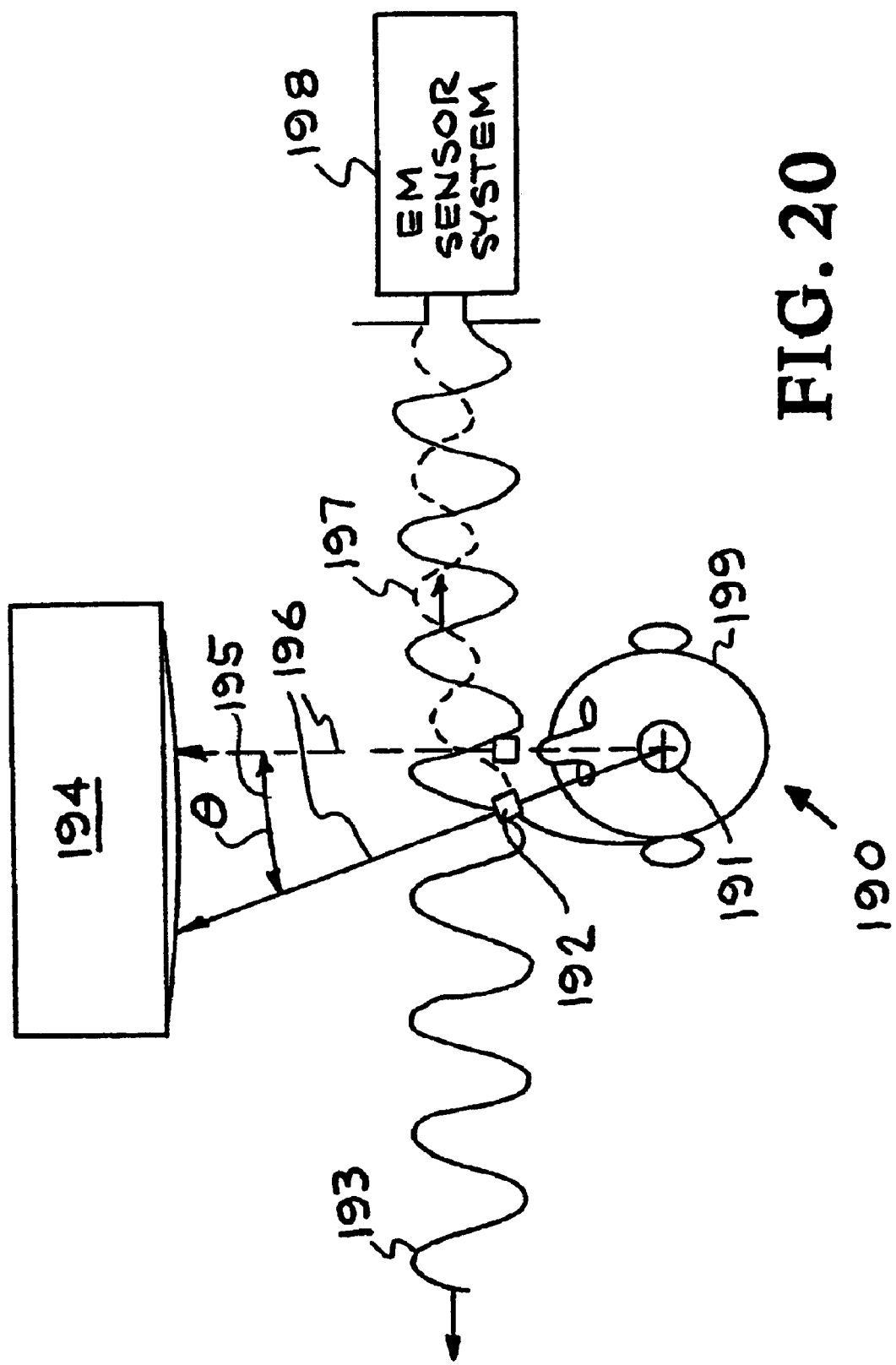
FIG. 20 shows a head-mounted locator unit and horizontal dimension.

The head-mounted locator unit 190 and aspects of the horizontal dimension are shown in FIG. 20. The head 199 of the user is shown with the boom microphone on the left side of the user. It holds a microphone and a reflecting radar target in front of the lips of the user. It also holds a speech recognition EM sensor for detecting pitch, etc. The axis of rotation 191 of the head is shown. The new position 192 of the radar target along the path of EM waves as head is turned by angle θ is shown. The EM wave train 193 from the homodyne radar is shown propagating from right to left. A top view of computer monitor 194 is shown. The angle θ, identified by the reference numeral 195, is associated with head rotation and associated radar target rotation (target located in microphone housing.) The direction lines 196 show horizontal points on screen associated with head rotation. The reflected wave is identified by the reference numeral 197 and the EM sensor system is identified by the reference numeral 198.

The systems position low-power, homodyne EM radar-like sensors for relative position measurements of a target antenna attached to a user's head. The target antenna described in FIG. 8 is used; however, the finger grips and button are removed. The target antenna is placed on a microphone mount as shown in FIGS. 19 and 20. FIG. 20 illustrates how head rotation in the horizontal plane of a workspace, moves a modulated radar antenna along the path of propagating EM waves from a low-power homodyne transmitter. A similar set up can be used to determine relative motion in a vertical plane (see FIG. 19). The targeted radar antenna in the locator unit (see FIG. 19) is located in front of a user's lips, in or on a microphone housing. This location is about 10 cm from the center of rotation of the head. This antenna is also electronically modulated, so that only its position change (and not surrounding motion of body parts, etc.) is detected by the homodyne radar EM sensor units. The EM sensor receivers (one each for normal and quadrature signal) are filtered so that it only detects EM waves modulated and reflected from the antenna attached to the user. The relative change in location of the antenna, as it moves with head rotation, is determined by how many waves, and fractions of waves, of the homodyne sensitivity function are detected as described in Tables 1 and 2 and FIGS. 14, 15, 16, and 17.

The need for perfect recti-linearity of the radar transmitter positions, relative to the computer screen, is unnecessary because the distance determination algorithms (once scaled using a "start" sub-algorithm) can easily accommodate non-orthogonal view directions.

The mounting of the locator unit in front of the users head enables the user to obtain instant visual feedback from the screen and can move his head slightly (or extensively) to move the antenna/microphone and correspondingly the cursor. (The antenna could be mounted behind to the side of the head alternatively.) Linearity-of-measurement and corresponding algorithms are not required since the user can move his head slightly to correct the cursor location on the screen, before pressing the button, or using voice. Provisions are made in the algorithms to increase or decrease sensitivity of cursor motion relative to head motion as required. The preferred method of starting the distance measurement is for the user to simply depress an appropriate button on the keyboard (e.g., the "m" key) and hold it down. The head is moved, while the button is held down; and when the proper location of the cursor is reached, the button is released.

The concurrent use of voice-activated controls using conventional microphones (or EM sensor-based speech recognizers) greatly enhances these locator-unit and EM-sensor concepts. Presence or absence of voice tone (i.e., microphone or EM sensor detected pitch) can turn on or off the positioning process. Short on/off modulation of voice tone can be used to signal button activation. By varying pitch, up or down, one can control additional activity such as adjusting up/down motion of a cursor on the screen; in response to increased or decreased voice pitch (while radar handles left to right motion), the cursor rises or drops. In addition by adjusting voice pitch up or down, one can adjust acoustic or range level controls on a screen, or adjust rates of motor speed that are controlled by a processor, or other concepts.

These ideas have significant value for paraplegics, because they solve several outstanding problems immediately. Head directed control and voice control can together be a very powerful control system for the disabled, or for very busy persons who must perform many simultaneous functions.

Radar Wand

Figure 21:
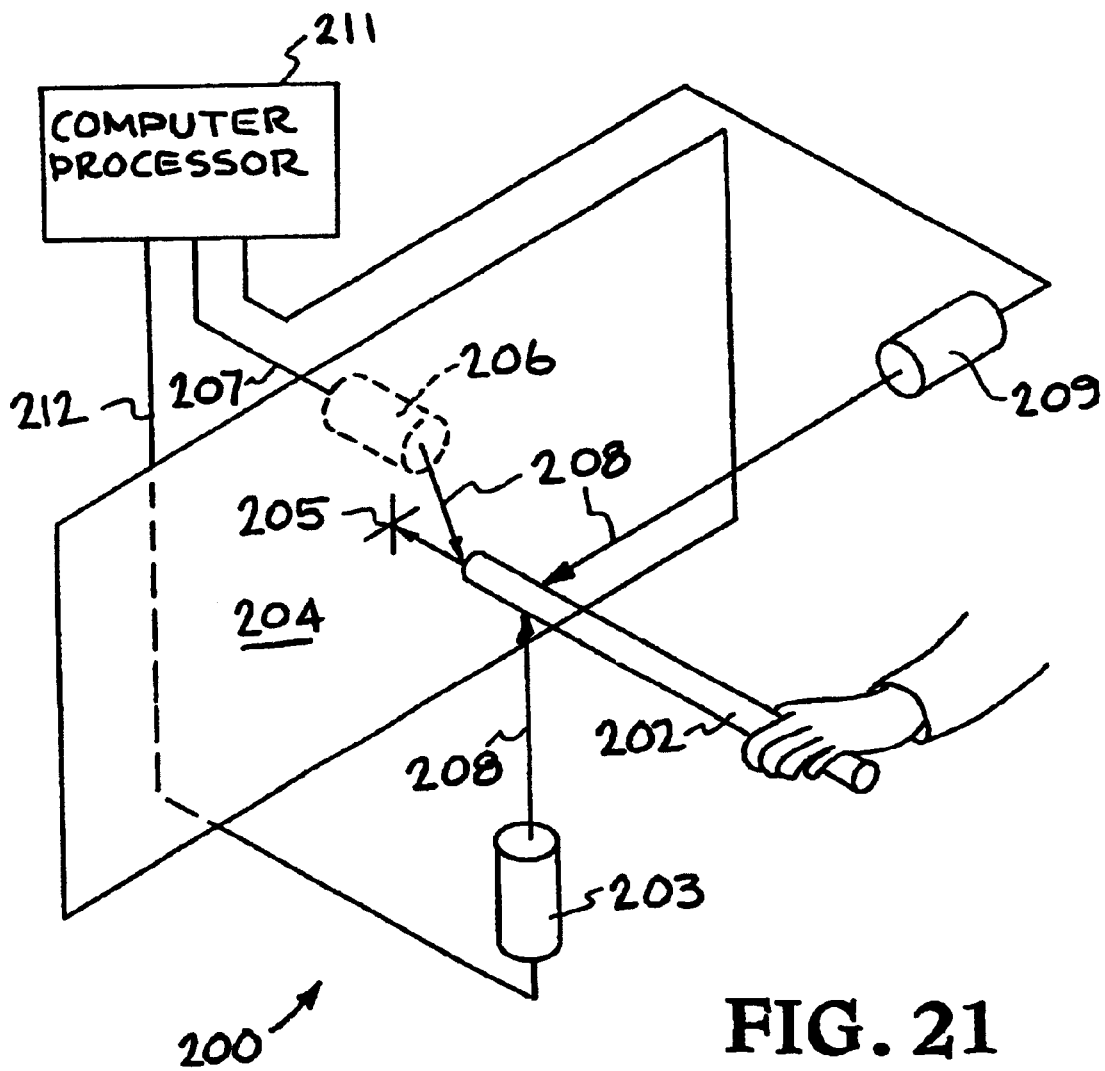
FIG. 21 shows a w an d-mounted locator unit and three-dimensional direction.

FIG. 21 shows a wand-mounted locator unit 200 with aspects of three dimensional directions. The user 210 holds a wireless wand 202 that includes modulated antennas and laser pointer to show screen location as needed. The "Sensor #2" 203 is generally located below the screen 204 of a computer or of a television. The screen cursor 205 is controlled by the wireless wand 202. The "Sensor #3" 206 is generally located behind the screen. The sensor #3 is shown with connection 207 to the processor 211. The EM wave path 208 is shown with the propagation direction indicated. The "Sensor #1" 209 is generally located to the side to track horizontal movements of the user's hand. The computer processor 211 determines the distance of wand travel and for moves the cursor on the screen. The computer processor 211 is shown with a connection 212 to sensor #2.

This system shown in FIG. 21 enables one or more users, holding a specially constructed wand, as shown in FIG. 10 and 11, to move graphical images across or "into" a computer screen, much as a hand-held mouse is rolled on a table, which "moves" a cursor across a computer monitor. The coupling of the special locator unit, (shaped as the wand shown in FIGS. 10 and 11), and one or more low-power EM sensor units, enables a user to be freed from rolling a device on a table, and enables freedom of control anywhere the radar's transmitted EM waves can reach the users hand-held wand. The system of a wireless pointing wand, a hand-held wand contains switched reflecting antennas that change their reflectivity at a nominal but well-defined switching rate of typically 1 kHz. Other persons, using wands switched at different rates (e.g., 2 kHz or any other frequency from about 100 Hz to >3 kHz), can employ them at the same time as the primary user, controlling their own graphical objects on the same screen. They all use the same radar sensors to sense their wands'motions, but the sensors have several output filters built inside to detect modulated signals from separately modulated wands. The diagram shown in FIG. 4 and the outputs from the various pass-band filters are used to determine which user's wand has moved along the homodyne sensitivity curves shown in FIGS. 2 and 3.

The very low-power homodyne radar sensors, illustrated herein as exemplary EM sensors, can measure modulated reflecting antennas at distances of over 15 meters. See FIG. 6. At this distance, they measure a signal that gives wand-distance-travel by using the homodyne sensitivity function shape versus position, and by determining how many one-wave cycles (each 2-zero crossings) have been traversed as the wand is moved (see FIG. 3). For example, if a 900-MHz radar sensor is used, with a wavelength of 33 cm, the sensor measures a large change in signal from positive to negative every 16 cm of movement; and multiple patterns of 16 cm motions (in the same direction, or even in oscillating directions) can be added up by the algorithm to get total distance traveled. By using two EM sensors located at an approximate 90° angle to each other, and at the edges of the workspace, changes in wand position, in a plane containing the two sensors, can be measured.

By using three EM sensors, each at an approximate 90° angle to each other, a change in wand position in a three-dimensional space, defined by the locations of the three sensors, will be determined. While the uses of mouse-directed movements of a cursor on a 2-dimensional computer monitor, are well understood, new uses (made possible by the locator-input units operating in three dimensions) are made possible by the invention herein. For example, by moving the wand toward a screen, the sensor can "tell" the computer to display a surface that is further into the image (see FIG. 21) for a 3-D locator-unit system.

Other System Applications

Other applications of the locator units include finger-ring or wrist-mounted locator devices for computer image control. The wand system (FIGS. 10 and 21) includes the addition of a laser or optical diode pointer at the end of the wand to designate positions on the screen. Another system of value is to place two or more locator units on an object to enable monitoring for rotation (such as a robot's arm or a user's arm, or a rotating system). The relative motions of each of the two or more locator units, with respect to each other, provide not only linear motion information, but also relative motion (e.g., rotation) of the units with respect to each other. In addition, by using a known reference location from where to start locator-motion (e.g., using the cursor home pattern in FIG. 1), the relative motion of the algorithms can be converted to absolute motion. Thus if a locator-unit is attached to a moving structure, which always begins to move from a known start location (i.e., rest or sleeping position), the locator-unit will register accurate relative motion with respect to the start location, but it will provide absolute movement, if the start location is known ahead of time and if its location coordinates are placed in the algorithmic procedure as the 1st location in the sequence of measurements, i, illustrated in the algorithms shown in Tables 1 and 2 and FIGS. 14, 15, 16, and 17.

Additional information includes the use of one or more switches on the wand handle to control signaling. One button can start the antenna-switching process (i.e., the reflectivity modulation at fixed rates), and a second button can add a second antenna modulation rate to serve as a signal, or a second (or third) button can control the pulsing light unit located on the wand. Separately, the light flash rate can be detected by a light sensor (see FIG. 1) located on one of the EM sensors, to cause a desired interpretation such as the selection of a menu item already located by the cursor.

Figure 22:
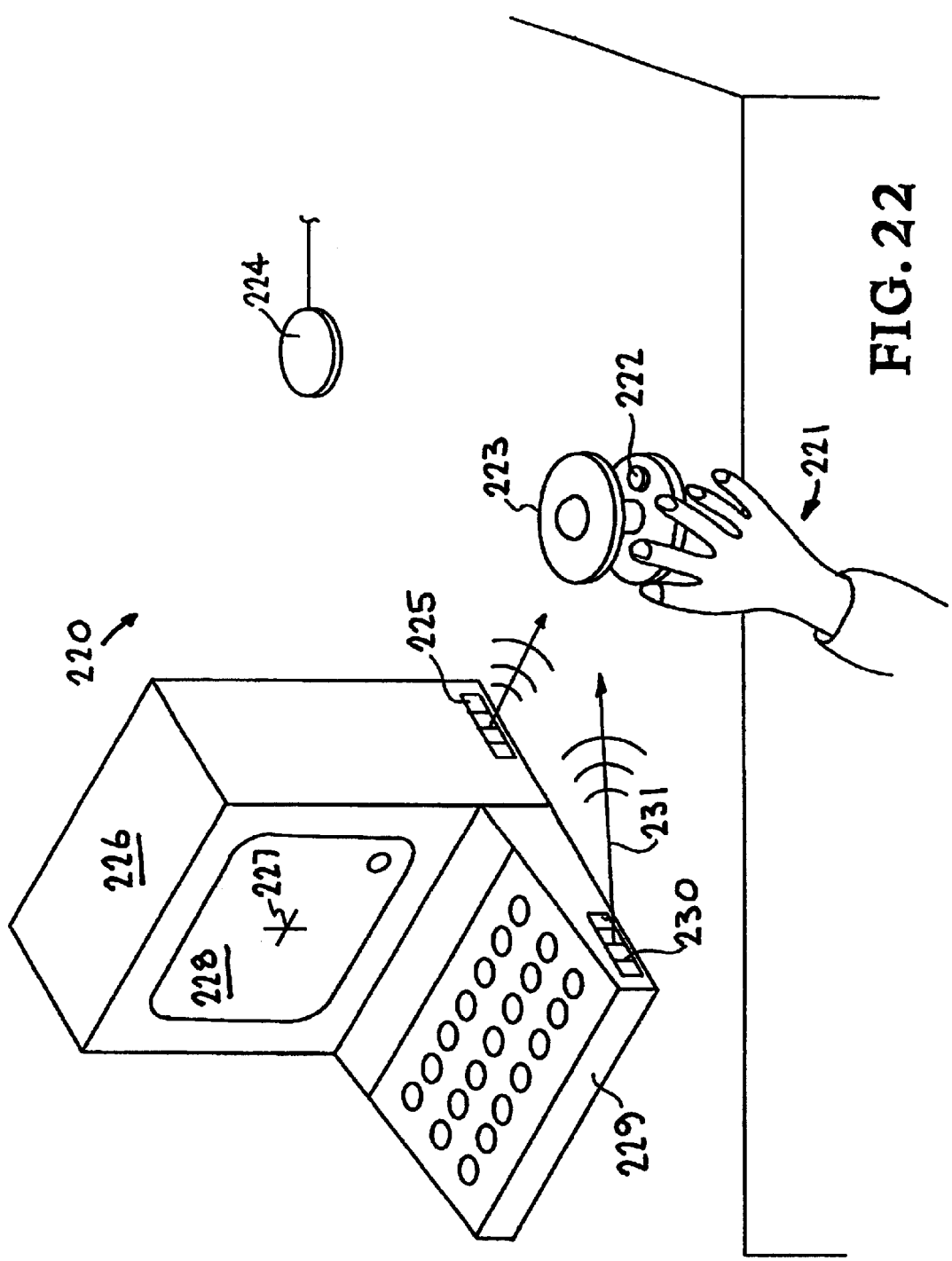
FIG. 22 shows a tabletop system with sensors in a computer.

FIGS. 22 and 23 illustrate a system wherein the EM sensors are built into a computer keyboard case and PC/computer case. This reduces the need for extra wires and cases to hold the EM sensor. FIG. 22 shows a table top system 220 with sensors and a computer. A user's hand 221 gently holds locator unit 223 between fingers or between thumb and first finger. Button 222 activates and deactivates "start of measuring" and "stop measuring." The system includes locator unit 223, battery charger unit 224 with a rest location for the locator-unit, the "EM Sensor #2" 225, monitor and digital processor 226, cursor 227, screen 228, keyboard 229, and "EM Sensor #1" 230. Signal 231 from EM sensor #1 and signal 232 from EM sensor #2 are transmitted to the locator unit 223. For stable operation in the illustration in FIG. 22, the keyboard must be fixed in location relative to the PC housing. Alternatively, the PC housing can hold two EM sensor units, and many other combinations can be added.

FIG. 23 is a pictorial diagram of a one-dimensional reversed sensor-locator illustrating a hand-directed information input system for a computer that incorporates an embodiment of the present invention. The reversed hand-directed information input system is generally designated by the reference numeral 310. In this 1-Dimensional embodiment, the EM sensor is moved while the switched antenna remains stationary which is a reversal of the EM-sensor and switched-antenna roles, relative to the example in FIG. 1. The system 310 includes the following structural units and operating elements: hand directed locator unit including antenna and internal EM sensor 311, button 312, stationary switched antenna unit 314. The hand-directed locator unit (including antenna) 311, and with button 312, controls an EM Sensor System that includes "EM Sensor #1" designated by the reference numeral 313. Signal wires or wireless paths 315 transmit signals to a computer 316. Algorithms in the computer convert signals from the EM sensor system into a 1-Dimensional cursor movement on a screen.

The EM sensor 313 in the hand directed unit 311 sends out a train of EM waves that "flood" a workspace in the direction of a stationary switched antenna unit. A wireless (or wired) locator unit 311 includes an EM-wave transmitter/receiver unit connected to an antenna that transmits and receives EM waves 316. The stationary switched antenna unit 314 has its reflectivity switched on and off, in a coded sequence, at rates, typically ranging from 200 Hz to >3 kHz, when the system is turned on. The EM wave 317, reflected from the stationary switched antenna unit, is coded by the reflectivity changes of the antenna to enable information to be carried back to the antenna on the hand directed locator unit, where it is received and processed by the EM sensor inside the unit in the same manner as described in FIGS. 14, 15, 16 & 17. The EM sensor in the hand directed locator unit, measures the relative distance that the locator unit 311 is moved (as directed by a user's hand 319 or other body part) along the direction of the straight line from the hand held locator to the stationary switched antenna unit. By relative we mean distance from start to finish of motion, as exemplified by the dimension "X" in FIG. 23. The dimension "X" is identified by the reference numeral 318.

3-D Reversed Locator System

FIG. 24 is a pictorial diagram of a desktop illustrating a 3 dimensional hand-directed information input system for a computer that incorporates a reverse embodiment of the present invention. In this example, the user can lift the locator unit from the 2-Dimensional table surface and move it upward, in a $3^{rd}$ Dimension, to provide an additional movement input. The hand-directed information input system is generally designated by the reference numeral 410. The system 410 includes the following structural units and operating elements: 3 stationary switched antenna units including antennas 411, 412, 413, button 414, one hand-held locator unit with built-in EM Sensor (see FIG. 4 for EM sensor example including multiple filter outputs) and antenna (see FIG. 10 for example) structure 415, signal wires or wireless paths 416, computer 417, screen 418, hand 419, cursor pattern 420, cursor home pattern 421, keyboard 422, thumb 423, first finger 424, EM waves 425, fingers 426, EM waves 427. The hand-directed locator unit, with button 429, controls an EM Sensor System that is attached to one or more antennas, 428 and 429, and contains 3 filters (see FIG. 4) corresponding to the switching frequencies of each of the stationary switched antenna units (3 in this example). Further, there is at least one stationary switched antenna unit (an example is illustrated in FIG. 7) to detect motion in each spatial dimension desired. Said switched antennas are noted as "switched antenna unit #1" designated by the reference numeral 411, stationary "switched antenna unit #2" designated by the reference numeral 412, and "stationary switched antenna unit #3" designed by the reference numeral 413. Signal wires or wireless paths 416 transmit signals and power from the hand held locator unit to the computer 16 and back to the locator unit. Other wires provide power 430 from the computer or other power supply to stationary switched antenna units. Algorithms, of types illustrated in Tables 1–3 and FIGS. 14 through 18 stored in the computer, convert signals from the EM sensor system into cursor movements on a screen 418.

The hand held locator unit, with internal EM sensor unit 415, sends out a train of EM waves that "flood" a workspace, in all desired directions. The EM waves are commonly sent when the button 414 is pressed. The three stationary "switched antenna units" 411, 412, and 413 are not necessarily located at right angles to each other. A hand held wireless (or wired) locator unit 415 includes an EM-wave antenna that transmits waves generated by and connected to the EM sensor also in the unit 415, and it then receives the characteristic EM waves which reflect from each stationary antenna unit. Each of the stationary antenna-locator units, has its internal antenna's reflectivity switched on and off at 3 different rates (see FIG. 7), which amplitude modulate the reflected signal, thereby identifying each stationary unit, and thus each different direction of locator movement. The switching rates of each unit typically range from 200 Hz to >3 kHz, but are distinct for easy signal separation in the hand held EM sensor by the filter units, when the system is switched on. The antenna in each stationary unit, is switched, using methods similar to those shown in FIG. 7, producing a unique coded signal to enable information describing the relative movement of the EM sensor to the stationary sensor to be determined. In this embodiment of the inventive ideas herein, only one (hand-held) EM sensor unit is used, designated by the reference numeral 415. It measures the relative distance, as the locator unit 415 is moved (as directed by a user's hand 19 or other body part) relative to each stationary antenna unit. Three or more signals from 3 or more different stationary switched antennas can be measured, amplified, peak integrated, filtered into three signal streams, and directed to the appropriate processor to show 3 or more cursor movements on a computer screen. By relative movement we mean distance from start to finish of motion. The advantage of the reverse system is that it uses only one EM sensor so that it is cheaper than using three separate EM sensor units, described above in the first embodiment. However, the hand held locator unit draws more power than the switched antenna locator unit, shown in the first system embodiment. This configuration leads to shorter battery life, or it necessitates a wire to carry power to the hand held unit which can interfer with the hand motion.

Summary of System

The present invention relates generally to systems and methods for automatically measuring the movement of a human-body-held computer input unit, and more particularly to systems and methods for determining the relative travel-distance of an input device, along the path of one or more Electromagnetic waves. The referenced EM waves are generated by very low power, radar-like electronic systems, and the input unit is wireless. Applications to other animate and inanimate systems are described.

The present invention provides an electromagnetic system for interacting with a computer though an input system to control a computer display. This system includes at least one sensor producing electromagnetic waves and an antenna operatively connected to the input system for interacting with the electromagnetic waves, with said system producing relative distance traveled information. Algorithms convert the relative distance traveled information to display signals and they direct the computer display according to the display signals.

The electromagnetic system includes a locator unit and an EM sensor system for sending out a train of EM waves that flood the workspace and measure the relative distance that the locator unit has traveled. The electromagnetic system includes EM wave transmit units, EM wave receive units, active reflecting locator units, and communication links. The EM sensor transmit units and EM sensor receive units have internal phase reference, the locator units have amplitude modulated EM wave reflectors, and there are algorithms for converting the relative distance traveled information to display signals. The algorithms for movement determination use methods based upon interferometric signal patterns and signal correction for controlling the computer display.

In one embodiment, the electromagnetic system includes Homodyne EM sensor units with one or more transmitters, receivers, and antennas for transmitting, receiving, and internal signal processing; locator units with one or more antennas, each whose reflectivity is modulated at one or more frequencies; and communication links to the computer. Another embodiment includes an inverted system in which hand-held or other locator units contain one or more EM sensor transmit and receive units with an internal phase reference system, and the system also includes stationary units each with one or more amplitude modulated EM wave reflectors. Locator units have circuitry for decoding and formatting one or more signal levels that are associated with the location and relative movement of one or more of the stationary units in the workspace. The electromagnetic system includes a system for absolute movement measurement from a home reference location.

Another embodiment is operated in a workspace, wherein the electromagnetic system includes a reverse system having a moveable locator unit with an EM sensor system for sending out a train of EM waves that flood the workspace and interact with stationary modulated antennas and produce the relative distance traveled information. The stationary antenna units having amplitude-code-modulated reflectors, wherein the electromagnetic system includes one or more homodyne EM transmit and receiver units with one or more antennas that transmit wave trains of coherent, narrow band, high frequency EM waves. There EM waves are reflected from the amplitude-code-modulated stationary reflectors, the reflected EM waves received by the EM receiver units and demodulated into two lower frequency signals, one normal and one offset by 90 degrees in phase, each of the signals carrying one or more codes of information in its frequency content, and wherein the algorithms decode the information and produce separated signals associated with the one normal lower frequency signal and the one lower frequency signal offset by 90 degrees in phase. The algorithms further analyze each of the lower frequency signals for spatial frequency patterns and other values that describe the relative distance traveled information. The algorithms also analyze the signals for time varying information, providing additional communication between the locator units and the homodyne EM transmit and receiver units, other than spatial frequency patterns. The algorithms include those correcting spatial frequency patterns for possible distortions, for signal noise, and include algorithms that format information for transmission to the computer for desired purposes of control or display.

The embodiments of the invention contain various units. The units include, but are not limited to the following: (1) one or more EM sensor transmit units and EM sensor receive units located in one or more stationary or moving packages, (2) one or more reflectivity modulated antennas with stable internal phase reference, (3) one or more common Transmit and Receive antennas, (4) a separate sensor antenna for transmit and separate sensor antenna for receive, (5) radar circuitry with an output signal that enters one or more filters which direct specific frequency components into specific decoding units, (6) decoding units that include a signal level and signal sign detection circuit, signal smoothing circuitry, and signal formatting and bus transmission circuitry, (7) a power supply for the at least one sensor, (8) a power supply that is a battery, (9) a power supply that is a separate power supply circuit, (10) a power supply that is a power line drawing power from the computer, (11) a secondary communication channel between the EM sensor system, the locator unit, and the computer, (12) a secondary communication channel that includes a secondary reflector-coding channel in the locator unit, (13) a secondary communication channel that includes a light diode communication link, (14) a secondary communication channel that includes a wireless link, (15) a secondary communication channel that includes conducting wires, (16) a secondary communication channel includes light fibers, (17) a locator unit that includes an antenna and the reflectivity of the antenna is modulated with amplitude versus time codes, (18) a locator unit that includes a plurality of antennas and the reflectivity of the antennas are modulated with amplitude versus time codes, (19) a locator unit that includes an antenna, an antenna modulation circuit, and a power supply, (20) one or more control buttons or knobs, a handle or mounting unit, and a covering case, (21) an electromagnetic system that includes a locator unit with 2D reflectivity for hand directed mouse like operation on a flat 2D workspace, (22) an electromagnetic system that includes a locator unit with 3D reflectivity for hand-held wand-like operation in a 2D workspace, (23) an electromagnetic system that includes a locator unit with 3D reflectivity for hand-held wand-like operation in a 3D workspace, (24) an electromagnetic system that includes a locator unit attached to a head mounted microphone unit for head directed motions, (25) an electromagnetic system that includes a locator unit with an active EM sensor that transmits a high frequency EM wave toward one or more stationary modulated reflector units and receives a coded high frequency EM wave from the reflectors, (26) a locator unit that processes the received EM waves and transmits them to the computer for computer processing and control, (27) a locator unit that contains a laser pointing unit, (28) a locator unit that contains one or more secondary communication units, (29) secondary communication units that transmit information between stationary and moving units by modulating an antenna reflectivity with one or more alternative amplitude versus time patterns, (30) a diode light communicator with a conventional wireless link with a wire connecting the locator unit to the system communication link or links and (31) an input unit battery charger connected to an AC power line.

The present invention provides a method of controlling a computer in a workspace using an input unit. The method includes the following steps: sending out a train of EM waves to flood the workspace. Receiving EM-waves are reflected from the input unit and a relative distance moved information signal is created. Algorithms convert the relative distance moved information signal to create a display signal. The computer is controlled in response to the display signal. A signal value preparation algorithm codes the reflectivity values of a modulated EM wave reflector and then decodes the corresponding received signals from the normal and quadrature receivers in the EM sensor into a signal for movement determination. A coded modulation format of the preparation algorithm consists of one or more combinations of a shorter pulse of larger amplitude and of one polarity followed by a longer pulse of lower amplitude and opposite polarity. The pulses are combined into a composite pulse which is then combined into a pulse train of repeating composite pulses. Each pulse train has a unique frequency content that can be easily filtered and directed into a unique signal path for simplified peak detection, smoothing, and processing.

Modulation patterns with different frequency contents can be used to modulate the reflectivity of an antenna in a locator unit and can be filtered into separate signal paths for other communication purposes in the EM sensor receiver unit. The algorithms include an algorithm consisting of a logic process for obtaining the relative movement of a locator unit. The logic process uses signal values from EM sensor units to count both the total number of whole wavelength distances that a unit has moved and to determine a partial wavelength distance moved. The algorithms find the location of the locator unit within one of four quadrature zones defined as sequential quarters of one wavelength distance and the algorithms determine the direction of motion of the unit. The algorithms include a relative motion algorithm that determines locator position within one wavelength distance by comparing the EM sensor signal values to a normal and quadrature homodyne function pattern of expected signal values versus location in a work space. The algorithms include a relative movement algorithm that determines locator position within one wavelength distance by comparing a ratio of the EM sensor's normal and quadrature signal values to a corresponding pattern of the expected ratio previously obtained of normal and quadrature signals versus location in a work space. The algorithms include pattern correction algorithms that first measure the normal and quadrature homodyne functions in a work space, process the data to determine if corrections processes are needed, and then store the first-measured function values versus position and also store corrected patterns for subsequent use.

The pattern correction algorithms can be requested by other signal processing algorithms to process instantly measured signals to remove included signal distortion which reduces the accuracy of the movement detection algorithm. The correction processes includes correction for reduction in signal value with distance of locator unit from an EM sensor, EM wave multi-path reflectivity effects, and unexpected signal increase or decrease effects that are inconsistent with expected locator movement versus time or versus distance patterns.

The methods and systems described herein are not intended to be exhaustive, but to guide the user in using the inventions herein. While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus for interacting with a computer and controlling a computer display, comprising:
   an input system with an electromagnetic (EM) system including
   at least one sensor producing EM waves,
   at least one sensor receiving EM waves, and
   with said receiving sensor having circuits for detecting said electromagnetic waves and producing signals,
   a locator unit including
   an antenna that receives and reflects said EM waves from said input system, and
   means for converting said signals into relative distance traveled and direction information and into display signals, and
   a system for controlling said computer display according to said display signals;
   wherein the apparatus is operated in a workspace, and wherein said electromagnetic (EM) system includes said locator unit and said input system for sending out a train of EM waves that flood said workspace and measure the relative distance and direction that said locator unit has traveled, said EM sensor system receiving reflected EM waves from said antenna in said locator unit, and said sensor produces said distance traveled and direction information.

2. The apparatus of claim 1 wherein said input system includes a stationary EM wave transmit unit, and a stationary EM wave receive unit, and said locator unit includes a moveable active reflecting locator unit including said antenna, and a communication link.

3. The apparatus of claim 1 wherein said input system includes EM sensor transmit units and EM sensor receive units, and said EM sensor transmit units and EM sensor receive units have circuits with internal phase reference, and said locator unit has amplitude modulated EM wave reflectors, and wherein said means for converting said relative distance traveled and direction information to display signals include means for movement determination which use methods based upon interferometric signal patterns and signal correction for controlling said computer display.

4. The apparatus of claim 1 wherein said input system includes Homodyne EM sensor units with one or more transmitters, receivers, and antennas for transmitting, receiving, and internal signal processing; and wherein said locator unit includes moveable locator units with one or more antennas, each whose reflectivity is modulated at one or more frequencies; and communication links to said computer.

5. The apparatus of claim 1 wherein said input system and said locator unit includes an inverted system in which hand-held or other moveable locator units contain one or more EM sensor transmit and receive units with an internal phase reference system; and that includes stationary reference units each with one or more amplitude modulated EM wave reflectors.

6. The apparatus of claim 1 for operating in a workspace wherein said locator unit includes individual locator units with circuitry for decoding and formatting one or more signal levels that are associated with the location, relative movement and direction of one or more of said locator units in said workspace, wherein said input system includes one or more homodyne EM sensors with normal and quadrature output signals, one or more antennas for transmitting and receiving one or more of said electromagnetic waves reflecting from one or more of said locator units.

7. The apparatus of claim 1 that utilizes a home reference location in connection with said input system, wherein said input system includes a system for absolute movement measurement, said system using means for setting initial conditions of said means for converting such that said relative distance traveled information is always determined with respect to said home reference location.

8. The apparatus of claim 1 operated in a workspace, wherein said antenna is in a fixed position in said workspace and wherein said input system includes a reverse system having a locator unit with an EM sensor system for sending out a train of EM waves that flood said workspace and interact with said antenna in a fixed position and produce said relative distance traveled and direction information.

9. The apparatus of claim 1 wherein said locator unit includes individual locator units having amplitude-code-modulated reflectors, wherein said input system includes one or more homodyne EM transmit and receiver units with one or more antennas that transmit wave trains of coherent, narrow band, high frequency EM waves that are reflected from said amplitude-code-modulated reflectors, said reflected EM waves received by said EM receiver units and demodulated into two lower frequency signals, one normal and one offset by 90 degrees in phase, each of said signals carrying one or more codes of information in its frequency content, and wherein said means for converting decode the information and produce two separated signals associated with said one normal lower frequency signal and with said one other lower frequency signal offset by a phase of 90 degrees.

10. The apparatus of claim 9 wherein said means for converting further analyze each of said lower frequency signals for spatial frequency patterns and other values that describe said relative distance traveled and distance information.

11. The apparatus of claim 10 wherein said means for converting also analyze said signals for time varying information, providing additional communication between said locator units and said homodyne EM transmit and receiver units, other than spatial frequency patterns.

12. The apparatus of claim 10 wherein said means for converting include those correcting spatial frequency patterns for possible distortions, for signal noise, and include means that format information for transmission to said computer for desired purposes of control or display.

13. The apparatus of claim 1 wherein said input system includes one or more EM sensor transmit units and EM sensor receive units located in one or more stationary or moving packages.

14. The apparatus of claim 13 wherein said input system includes one or more reflectivity modulated antennas with stable internal phase preference.

15. The apparatus of claim 1 wherein said input system includes a common T&E antenna.

16. The apparatus of claim 1 wherein said system includes a separate antenna for transmit and separate antenna for receiver.

17. The apparatus of claim 1 wherein said input system includes radar circuitry with an output and the output of said radar circuitry has one or more filters which direct specific frequency components into specific decoding units.

18. The apparatus of claim 17 wherein said decoding units include a signal level detection circuit, signal smoothing circuitry, and signal formatting and bus transmission circuitry.

19. The apparatus of claim 1 including a power supply for said at least one sensor.

20. The apparatus of claim 19 wherein said power supply is a battery.

21. The apparatus of claim 19 wherein said power supply is a separate power supply circuit.

22. The apparatus of claim 19 wherein said power supply is a power line drawing power from said computer.

23. The apparatus of claim 1 including a secondary communication channel between said input system, said locator unit, and said computer.

24. The apparatus of claim 23 wherein said secondary communication channel includes a secondary reflector-coding channel in said locator unit.

25. The apparatus of claim 23 wherein said secondary communication channel includes a light diode communication link.

26. The apparatus of claim 23 wherein said secondary communication channel includes a wireless link.

27. The apparatus of claim 23 wherein said secondary communication channel includes conducting wires.

28. The apparatus of claim 23 wherein said secondary communication channel includes light fibers.

29. The apparatus of claim 1 wherein said locator unit includes an antenna and the reflectivity of said antenna is modulated with amplitude versus time codes.

30. The apparatus of claim 1 wherein said locator unit includes a plurality of antennas and the reflectivity of said antennas are modulated with amplitude versus time codes.

31. The apparatus of claim 1 wherein said locator unit includes an antenna, an antenna modulation circuit, and a power supply.

32. The apparatus of claim 1 including one or more control buttons or knobs, a handle or mounting unit and a covering case.

33. The apparatus of claim 1 wherein said electromagnetic system includes a locator unit with 2D reflectivity for hand directed mouse like operation on a flat 2D workspace.

34. The apparatus of claim 1 wherein said electromagnetic system includes a locator unit with 3D reflectivity for hand-held wand-like operation in a 3D workspace.

35. The apparatus of claim 1 wherein said input system includes a locator unit attached to a head mounted microphone unit for head directed motions.

36. The apparatus of claim 1 wherein said system includes a locator unit that contains an active EM sensor that transmits a high frequency EM wave toward one or more stationary modulated reflector units and receives a coded high frequency EM wave from said reflectors.

37. The apparatus of claim 36 wherein said locator unit processes said received EM waves and transmits them to said computer for computer processing and control.

38. The apparatus of claim 1 wherein said locator unit contains a laser pointing unit.

39. The apparatus of claim 1 wherein said locator unit ms a one or more secondary communication units.

40. The apparatus of claim 39 wherein said secondary communication units transmit information between stationary and moving units by modulating an antenna reflectivity with one or more alternative amplitude versus time patterns.

41. The apparatus of claim 39 including a diode light communicator with a conventional wireless link with a wire connecting said locator unit to the system communication link or links.

42. The apparatus of claim 1 wherein said locator unit includes means for signal preparation—digital and analog—that code the reflectivity values of a modulated EM wave reflector into corresponding signals in the normal and in the quadrature receivers in the EM sensor, which are further converted into signals for movement determination.

43. The apparatus of claim 1 wherein said means for converting include a coded modulation format, of said means for signal preparation, consisting of one or more combinations of a shorter pulse of larger amplitude and of one polarity, followed by a longer pulse of lower amplitude and opposite polarity.

44. The apparatus of claim 43 wherein said pulses are combined into a composite pulse which is then combined into a train of repeating composite pulses.

45. The apparatus of claim 44 wherein each said pulse train has a unique repetition frequency content that can be easily filtered and directed into a unique signal path for simplified peak detection, smoothing, and processing.

46. The apparatus of claim 1 wherein said means for converting include an algorithm consisting of a logic process for obtaining the relative movement, including direction, of a locator unit.

47. The apparatus of claim 46 wherein said logic process uses signal values from EM sensor units to count both the total number of whole wavelength distances that a unit has moved and by determining a partial wavelength distance moved.

48. The apparatus of claim 1 wherein said means for converting find the location of the locator unit within one of four quadrature zones defined as sequential quarters of one wavelength distance and said means for ing determine the direction of motion of said unit.

49. The apparatus of claim 1 wherein said means for converting include a relative motion algorithm that determines locator position within one wavelength distance by comparing the EM sensor signal values to a normal and quadrature homodyne function pattern of expected signal versus location in a work space.

50. The apparatus of claim 1 wherein said means for converting include a relative movement algorithm that determines locator position within one wavelength distance by comparing a ratio of the EM sensor's normal and quadrature signal values to a corresponding pattern of the expected ratio previously obtained of normal and quadrature signals versus location in a work space.

51. The apparatus of claim 50 wherein said means for converting determine the total number of wavelengths moved.

52. The apparatus of claim 1 wherein said means for converting include pattern correction means that first measure the normal and quadrature homodyne functions in a work space, process the data to determine if correction processes are needed, and then store said first-measured function values versus position and also store corrected patterns for subsequent use.

53. The apparatus of claim 52 wherein said pattern correction means can be requested by other signal processing means for converting to process instantly measured signals to remove included signal distortion, said distortion reduces the accuracy of the movement detection algorithm.

54. The apparatus of claim 53 wherein said correction processes includes correction for reduction in signal value with distance of locator unit from an EM sensor, EM wave multi-path reflectivity effects, and unexpected signal increase or decrease effects that are inconsistent with expected locator movement versus time or versus distance patterns.

55. A method of controlling a computer display in a workspace using a locator unit, comprising the steps of:

sending out a train of EM waves to flood said workspace, receiving EM waves that are reflected from said locator unit, using said EM waves that are reflected from said locator unit to create a relative distance moved information signal, using algorithms to convert said relative distance moved information signal to a display signal, controlling said computer display in response to said display signal, and avoiding interference between two or more EM sensors by modulating the locator unit's antenna reflectivity with two or more separate coding patterns, each one of which are uniquely sensed by only one EM sensor.

56. The method a controlling a computer in a workspace using an input unit of claim 55 wherein said modulating the locator unit's antenna reflectivity with two or more separate coding patterns causes transmissions from each EM unit to be coded, upon reflection, with two or more patterns, but each EM sensor detects locator unit movement by only measuring reflectivity changes coded by its unique pattern, which is detected in its receiver unit.

57. A method of controlling a computer in a workspace using an input unit of claim 56 including the step of avoiding interference between two or more EM sensors by using a trigger circuit to cause transmissions from each unit to occur when the other unit or units are not transmitting.

58. A method of controlling a computer display in a workspace using an antenna, comprising the steps of:

receiving EM waves that are reflected from said antenna, sending out a train of EM waves to flood said workspace, using said EM waves that are reflected from said antenna to create a relative distance moved information signal, using algorithms to convert said relative distance moved information signal to a display signal, wherein said algorithms include algorithms for correcting spatial frequency patterns for possible distortions, for signal noise, and include algorithms that format information for transmission to said computer for desired purposes of control or display, and controlling said computer display response to said display signal.

59. The method of claim 58 wherein said algorithms convert said relative distance traveled information signal to said display signal includes algorithms for movement determination that use methods based upon interferometric signal patterns and signal correction for controlling said computer display.

60. The method of claim 58 wherein said algorithms include a coded modulation format consisting of one or more combinations of a shorter pulse of larger amplitude and of one polarity, followed by a longer pulse of lower amplitude and opposite polarity.

61. The method of claim 58 wherein said algorithms include an algorithm consisting of a logic process for obtaining the relative movement of a locator unit.

62. The method of claim 58 wherein said algorithms include a relative motion algorithm that determines locator position within one wavelength distance by comparing the EM sensor signal values to a normal and quadrature homodyne function pattern of expected signal values versus location in a work space.

63. The method of claim 62 wherein said relative motion algorithm includes comparing the ratios of normal to quadrature signals and quadrature to normal signal to said expected ratios versus position-location to determine location in a work space.

64. The method of claim 58 wherein said algorithms include pattern correction algorithms that first measure the normal and quadrature homodyne functions in said work space, process the data to determine if corrections processes are needed, and then store said first-measured function values versus position and also store corrected patterns for subsequent use.

* * * * *